(12) United States Patent
Inoue et al.

(10) Patent No.: US 6,693,965 B1
(45) Date of Patent: Feb. 17, 2004

(54) APPARATUS FOR AND METHOD OF EMBEDDING AND EXTRACTING DIGITAL INFORMATION, AND MEDIUM HAVING PROGRAM FOR CARRYING OUT THE METHOD RECORDED THEREON

(75) Inventors: Hisashi Inoue, Fukuoka (JP); Takashi Katsura, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/489,312

(22) Filed: Jan. 21, 2000

(30) Foreign Application Priority Data

| Jan. 22, 1999 | (JP) | ............................................ | 11-015011 |
| May 19, 1999 | (JP) | ............................................ | 11-138914 |

(51) Int. Cl.⁷ ........................... H04N 7/12; H04N 11/02; H04N 11/04; G06K 9/36
(52) U.S. Cl. .................. 375/240.19; 382/100; 382/175; 382/232; 382/251; 382/250
(58) Field of Search ...................... 375/240.19; 382/100, 382/175, 232, 251, 250

(56) References Cited

U.S. PATENT DOCUMENTS

| 5,412,741 | A | * | 5/1995 | Shapiro ....................... | 382/232 |
| 5,748,763 | A | * | 5/1998 | Rhoads ........................ | 382/115 |
| 6,111,990 | A | * | 8/2000 | Sugaya et al. ............... | 382/250 |
| 6,185,312 | B1 | * | 2/2001 | Nakamura et al. ........... | 382/100 |
| 6,477,276 | B1 | * | 11/2002 | Inoue et al. ................. | 382/232 |

FOREIGN PATENT DOCUMENTS

| EP | 0 840 513 | 5/1998 |
| EP | 0 855 681 | 7/1998 |
| JP | 11-196262 | 7/1999 |
| WO | 99/01980 | 1/1999 |

OTHER PUBLICATIONS

Houng–Jyh Wang and C.–C. Jay Kuo, Image Protection via Watermarking on Perceptually Significant Wavelet Coefficients, Multimedia Signal Processing, 1998 IEEE Second Workshop on Dec. 7–9, 1998, pp. 279–284.*

"Embedding a Signature to Pictures under Wavelet Transformation", by Kineo Matsui et al., Journal of the Institute of Electronics, Information and Communication Engineers D–II vol. J79–D–11, No. 6, pp. 1017–1024, Jun. 1996.

"A Method of Watermarking under Frequency Domain for Protecting Copyright of Digital Image", by Takao Nakamura et al., The Symposium on Cryptography and Information Security, SCIS'97–26A, Jan. 1997.

Onishi J et al.; "A Method of Watermarking with Multiresolution Analysis and Pseudo Noise Sequences", Systems & Computers in Japan, Scripta Technica Journas, New York, U.S., vol. 29, No. 5, Nov. 1997, pp. 3020–3028.

* cited by examiner

*Primary Examiner*—Charles Parsons
(74) *Attorney, Agent, or Firm*—Wenderoth, Lind & Ponack, L.L.P.

(57) ABSTRACT

A digital information embedding apparatus comprises a band divider, a block divider, a key generator, an information embedder and a band synthesizer. The band divider divides the digital image signal into a plurality of frequency bands to obtain wavelet coefficients. The block divider divides the frequency band in which the digital information is to be embedded into a plurality of blocks in a predetermined block size. The key generator respectively generates secondary keys having different values from a key having a predetermined value using a predetermined function. The information embedder specifies the block in the embedding object region based on each of the generated secondary keys, and respectively embeds the corresponding information composing the digital information in the wavelet coefficients in the specified block in the embedding object region. The band synthesizer reconstructs a digital image signal.

6 Claims, 23 Drawing Sheets

F I G. 1
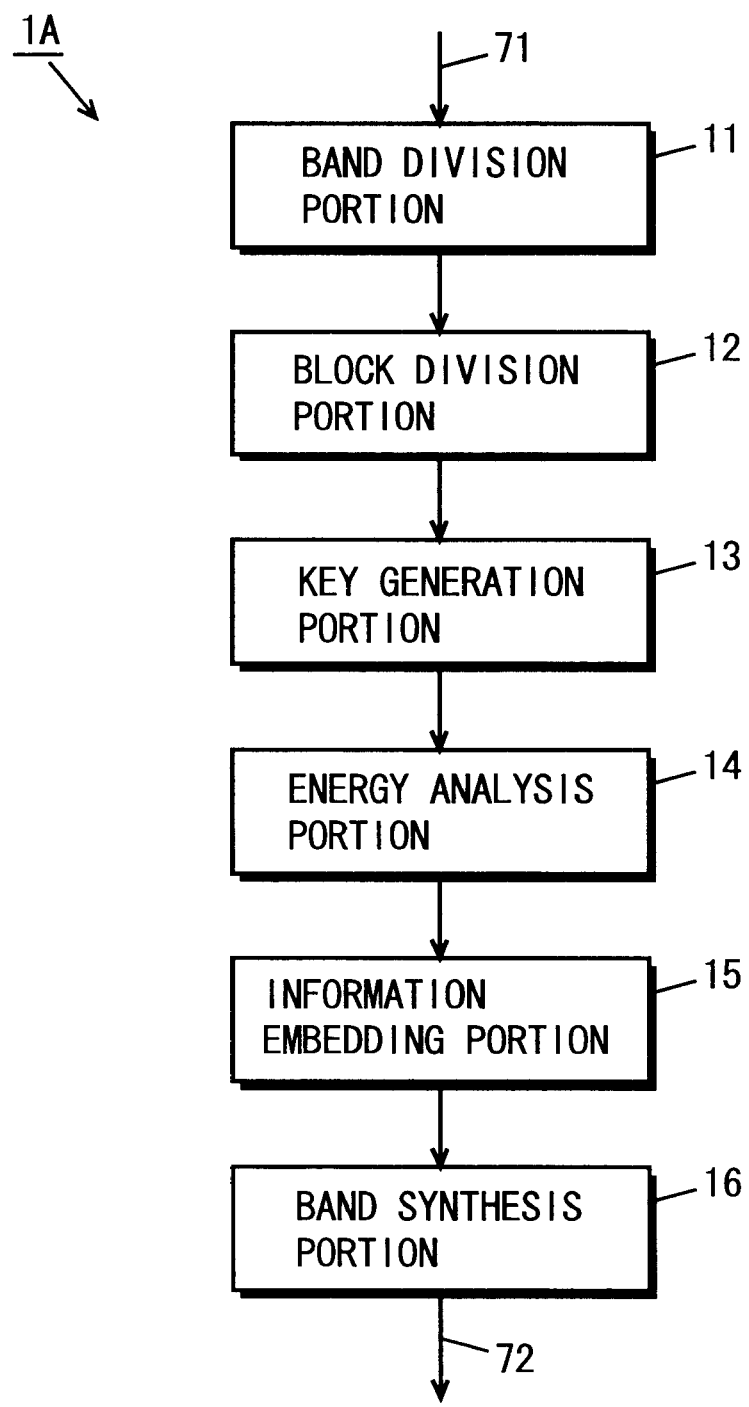

| SECONDARY KEY | FLAG |
|---|---|
| $r_1$ | 0 |
| $r_2$ | 1 |
| $r_3$ | 0 |
| ⋮ | ⋮ |
| | |
| | |
| | |
| | |
| ⋮ | ⋮ |
| $r_{N-1}$ | 1 |
| $r_N$ | 1 |

F I G. 1 1
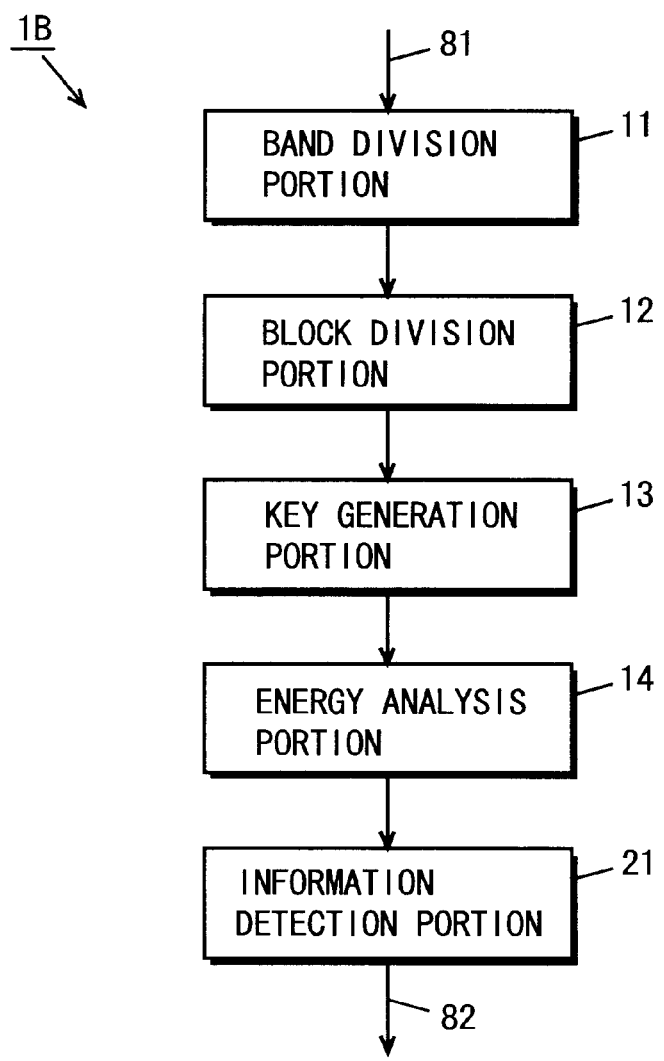

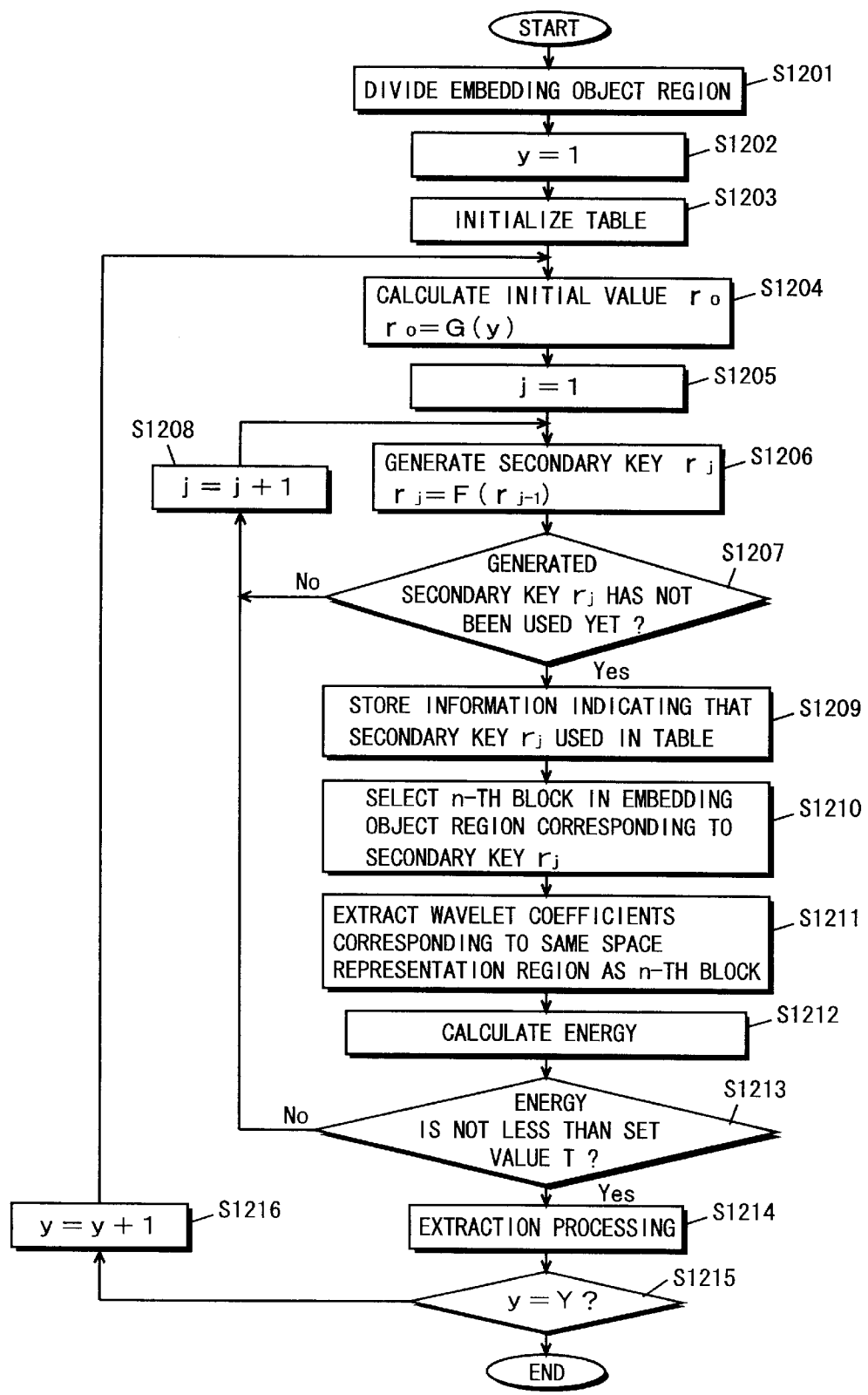

F I G. 16
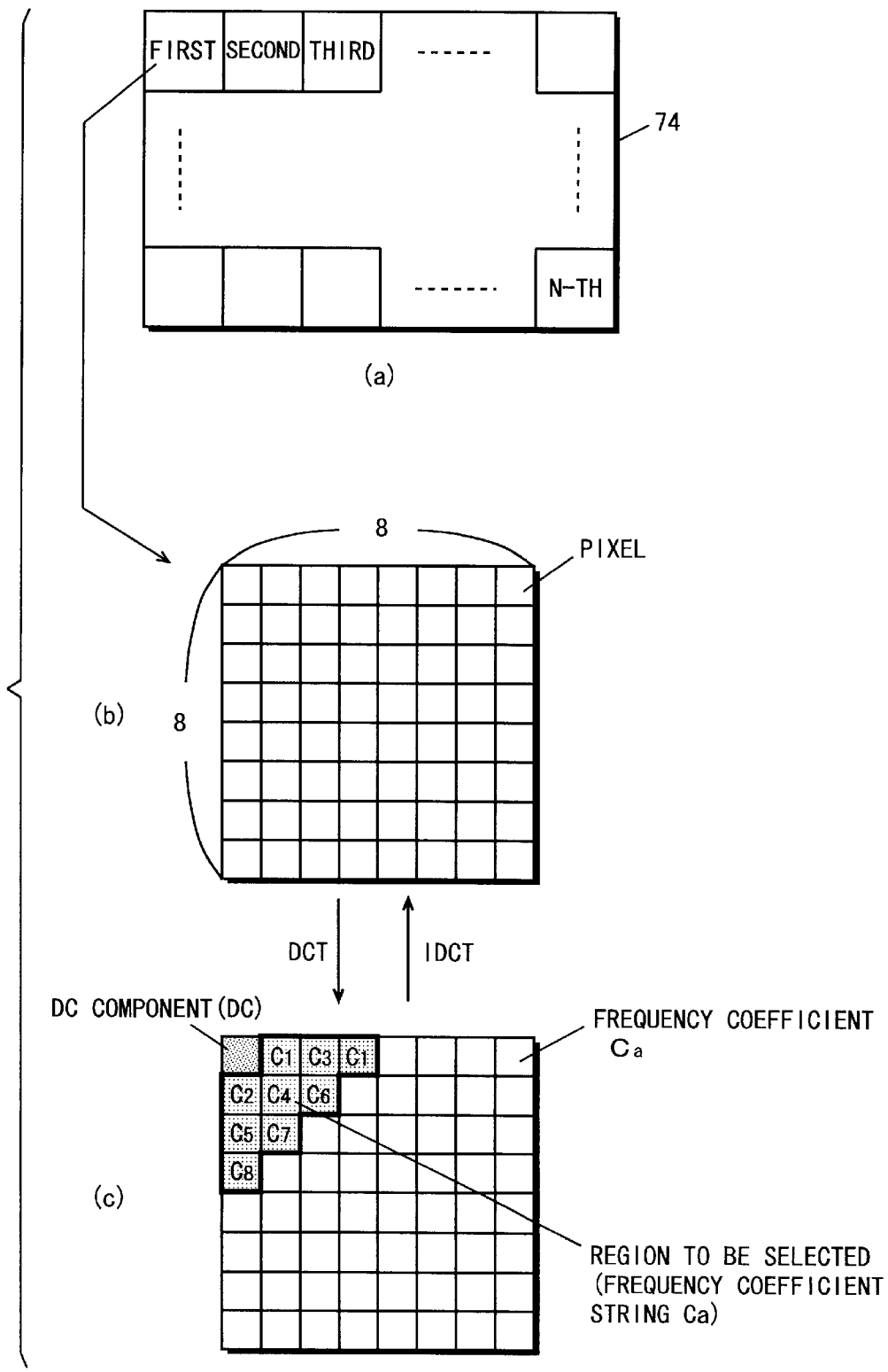

APPARATUS FOR AND METHOD OF EMBEDDING AND EXTRACTING DIGITAL INFORMATION, AND MEDIUM HAVING PROGRAM FOR CARRYING OUT THE METHOD RECORDED THEREON

BACKGROUND OF THE INVENTION

1. Field of the Invention

The present invention relates to apparatuses for and methods of embedding and extracting digital information as well as a medium having a program for carrying out the method recorded thereon, and more particularly, to an apparatus for and a method of embedding, in order to protect the copyright of digital data, digital data such as copyright information (hereinafter referred to as digital information) in an image signal and extracting the embedded digital information as well as a medium having a program for carrying out the method recorded thereon.

2. Description of the Background Art

In recent years, information utilizing the Internet has been extensively provided. Particularly, WWW (World Wide Web) has been frequently utilized as an information transmitting/receiving service in which image, voice and so forth are integrated.

However, digital data such as an image which is made public on a network of the Internet can be easily copied by many and unspecified users. Therefore, some problems have arisen. For example, an image whose copyright is owned by a third person is secondarily utilized by making unauthorized copying thereof without the permission of the copyright holder. Further, also in expanding the business on the Internet using image-based contents, measures to prevent the unauthorized copying have been also a problem. Therefore, the establishment of a technique for protecting the copyright of an image signal has been damanded.

An example of the measures conventionally known is an electronic (digital) watermark technique. The digital watermarking is a technique for embedding digital information in image data in such a form that the embedded digital information cannot be perceived by human being.

Examples of the conventional digital watermark technique include a digital watermark technique using discrete wavelet transform described in an article entitled by Matsui, Ohnishi, Nakamura, "Embedding a Signature to Pictures under Wavelet Transformation" (Journal of the Institute of Electronics, Information and Communication Engineers D-II VOL. J79-D-II, No. 6, PP.1017–1024, June 1996) (hereinafter referred to as a technique by Matui et al.). Further, another example is a digital watermark technique using discrete cosine transform (DCT) described in an article entitled by Nakamura, Ogawa, Takashima "A method of Watermarking under Frequency Domain for Protecting Copyright of Digital Image" (The Symposium on Cryptography and Information Security, SCIS'97-26A, January 1997) (hereinafter referred to as a technique by Nakamura et al.).

The technique by Matui et al. will be first described with reference to FIGS. 23 to 25.

First, band division by discrete wavelet transform processing is described. FIG. 23 is a block diagram showing an example of the configuration of a conventional band dividing device 11 for division into three hierarchies. In FIG. 23, the conventional band dividing device 11 comprises first to third band dividing filters 100, 200 and 300 having the same configuration. Each of the first to third band dividing filters 100, 200 and 300 divides an input image into four frequency bands, and calculates wavelet coefficients for each of the frequency bands. As to the wavelet coefficients, sub-band division will do, which is not described herein.

The band dividing device 11 inputs a digitized image signal 71 into the first band dividing filter 100. The first band dividing filter 100 divides the image signal 71 into signals in four bands, i.e., an LL1 signal, an LH1 signal, an HL1 signal and an HH1 signal (hereinafter generically referred to as first hierarchical signal) on the basis of parameters of its horizontal and vertical frequency components. The second band dividing filter 200 receives the LL1 signal in the lowest band in the first hierarchical signal, and further divides the LL1 signal 71 into an LL2 signal, an LH2 signal, an HL2 signal and an HH2 signal in four bands (hereinafter generically referred to as second hierarchical signal). The third band dividing filter 300 receives the LL2 signal in the lowest band in the second hierarchical signal, and further divides the LL2 signal into an LL3 signal, and LH3 signal, an HL3 signal and an HH3 signal in four bands (hereinafter generically referred to as third hierarchical signal).

FIG. 24 is a block diagram showing an example of the detailed configuration of the first band dividing filter 100 shown in FIG. 23. In FIG. 24, the first band dividing filter 100 comprises first to third two-band division portions 101 to 103. The first to third two-band division portions 101 to 103 respectively comprise one-dimensional low-pass filters (LPFs) 111 to 113, one-dimensional high-pass filters (HPFs) 121 to 123, and sub-samplers 131 to 133 and 141 to 143 for decimating a signal at a ratio of 2:1.

The first two-band division portion 101 receives the image signal 71, and respectively subjects the image signal 71 to low-pass filtering and high-pass filtering with respect to its horizontal component by the LPF 111 and the HPF 121 to output two signals. The signals obtained by the low-pass filtering and the high-pass filtering are respectively decimated at a ratio of 2:1 using the sub-samplers 131 and 141, and are then outputted to the subsequent stage. The second two-band division portion 102 receives the signal from the sub-sampler 131, and respectively filters the signal with respect to its vertical component by the LPF 112 and the HPF 122 to obtain two signals, decimates the signals at a ratio of 2:1 using the sub-samplers 132 and 142, and then outputs the signals, i.e., an LL signal and an LH signal. On the other hand, the third two-band division portion 103 receives the signal from the sub-sampler 141, respectively filters the signal with respect to its vertical component by the LPF 113 and the HPF 123 to obtain two signals, decimates the signals at a ratio of 2:1 using the sub-samplers 133 and 143, and then outputs the signals, i.e., an HL signal and an HH signal.

Consequently, the four signals, i.e., the LL1 signal which is low in both its horizontal and vertical components, the LH1 signal which is low in its horizontal component but is high in its vertical component, the HL1 signal which is high in its horizontal component but is low in its vertical component, and the HH1 signal which is high in both its horizontal and vertical components, that is, wavelet coefficients are outputted from the first band dividing filter 100. The second and third bank dividing filters 200 and 300 also respectively subject the received signals to the same processing as described above.

As a result of the band division processing performed by the first to third band dividing filters 100, 200 and 300, the image signal 71 is divided into ten band signals, i.e., an LL3 signal, an LH3 signal, an HL3 signal, an HH3 signal, an LH2 signal, an HL2 signal, an HH2 signal, an LH1 signal, an HL1 signal and an HH1 signal. FIG. 25 is a diagram showing representation of the ten band signals by a two-dimensional frequency region.

In FIG. 25, the vertical axis represents a vertical frequency component, which increases as is directed downward, and the horizontal axis represents a horizontal frequency component, which increases as is directed rightward. Each of regions shown in FIG. 25 is data serving as one image, and the area ratio of the regions coincides with the ratio of the respective numbers of data in the band signals. That is, in a case where the number of data in the LL3 signal, the LH3 signal, the HL3 signal and the HH3 signal which are the third hierarchical signal is taken as one, the number of data in the LH2 signal, the HL2 signal and the HH2 signal which are the second hierarchical signal is 4, and the number of data in the LH1 signal, the HL1 signal and the HH1 signal which are the first hierarchical signal is 16. Consequently, with respect to one data at the upper left of the LL3 signal, for example, one data at the upper left of each of the LH3 signal, the HL3 signal and the HH3 signal, 4 square-shaped data at the upper left of each of the LH2 signal, the HL2 signal and the HH2 signal, 16 square-shaped data at the upper left of each of the LH1 signal, the HL1 signal and the HH1 signal represent the same pixel on an original image (shaded portions in FIG. 25).

Description is now made of a method of embedding digital information after the above-mentioned discrete wavelet transform is performed for band division. The embedding method described next below is a well-known technique for those skilled in the art. Matui et al. realize digital watermarking by combining the discrete wavelet transform and the conventional embedding method.

The conventional embedding method utilizes such visual characteristics of human being who easily overlook noises in a high frequency region but detect noises in a low frequency region. That is, in an image signal, energy is concentrated in its low frequency component. Therefore, in output components in the discrete wavelet transform, an LL signal representing a low frequency component of the image signal is an important band component. On the other hand, three types of multi-resolution representation (MRR) components which are an LH signal, an HL signal and an HH signal representing high frequency components of the image signal are not considered so important band components.

With respect to each of the LH1 signal, the HL1 signal and the HH1 signal which are the not-so-important MRR components, the logical value of a low-order bit (the least significant bit (LSB) if possible) of a wavelet coefficient, which is not zero, out of wavelet coefficients in the MRR component is transformed in accordance with the bit value of digital information to be embedded on the basis of predetermined regularity, to perform digital watermarking.

In the technique by Matui et al., the digital information is embedded in only the MRR components which are high frequency components of an image calculated by the discrete wavelet transform and their respective low-order bits which hardly affect the change in the image. Therefore, the degradation of the quality of an image reconstructed by the signal in which the digital information has been embedded is so slight that it would not be perceived with the eyes of human being.

In the case of display and distribution on a network, the signals in the respective frequency bands which have been subjected to the embedding processing are synthesized by a band synthesizing device (in short, performing processing reverse to the discrete wavelet transform), to reconstruct an image signal. Further, in order to extract the embedded digital information from the reconstructed image signal, the discrete wavelet transform is performed to extract the logical value transformed in the embedding processing.

In the above-mentioned technique by Matui et al., however, the digital information is embedded in the LH1 signal, the HL1 signal and the HH1 signal which are the highest of the high frequency (MRR) components, the following problems remain:

1. By frequency-transforming the image in which the digital information has been embedded, and then rewriting and cutting the high frequency components of the image, the embedded digital information can be removed relatively simply.

2. Even by subjecting the image in which the digital information has been embedded to low-pass filtering, the high frequency components of the image are reduced, so that the embedded information is lost.

3. Furthermore, in image communications, for example, the image is transmitted upon being compressed. In the case, the high frequency components of frequency coefficients are generally coarsely quantized to perform irreversible compression, so that the effect on the high frequency components of the image is increased. That is, the respective low-order bits of the wavelet coefficients in the MRR component of the image are significantly changed, so that the embedded information cannot be correctly extracted.

Therefore, the inventors and others of the present application have proposed a new digital watermark technique (hereinafter referred to as earlier application) in "Japanese Patent Application No. 10-196361" previously filed in order to solve the problems in the conventional digital watermark technique.

An embedding method in the earlier application is a method of setting an output value in quantization to an even value or an odd value in its closest vicinity in accordance with the bit value of digital information to be embedded when wavelet coefficients are subjected to linear quantization. That is, the lowest frequency band component of an image signal (hereinafter referred to as MRA component (multi-resolution approximation component)) is divided into a plurality of blocks in a predetermined block size, to embed the digital information in the average value of the wavelet coefficients in each of the blocks using the above-mentioned embedding method.

In the earlier application, the MRA which is the low frequency component of the image signal which has been calculated by discrete wavelet transform is thus subjected to digital information embedding processing utilizing a quantizing error.

The technique by Nakamura et al. will be briefly described. In the technique by Nakamura et al., a digital image signal is first divided into blocks each composed of 8 by 8 pixels in the case of embedding, and each of the blocks is subjected to a DCT operation to transform the frequency thereof (i.e., to find frequency coefficients). One frequency coefficient C is then extracted at random from the frequency coefficients in low frequency components excluding a frequency coefficient in a DC component (DC coefficient), and the frequency coefficient C is quantized again using a quantization step-size h, as indicated by the following equation (1), to find a quantization value q. A function int[X] represents linear quantization of X:

$$q = \text{int}[C/h] \times h \tag{1}$$

In the technique by Nakamura et al., an integer closest to the frequency coefficient C is selected, to correct the value of the frequency coefficient C on the basis of the following equation (2) if a bit b of the digital information to be embedded in a block is "0" and on the basis of the following equation (3) if the bit b is "1". A character t denotes a natural number for selecting the closest vicinity.

$$C \leftarrow q+ht+q/4 \quad (2)$$

$$C \leftarrow q+ht+3q/4 \quad (3)$$

On the other hand, in the technique by Nakamura et al., in the case of extraction, the frequency coefficient C in which the digital information has been embedded is first extracted, and is then requantized by the foregoing equation (1) using the quantization step-size h, the find a quantization value q. A difference p (=C−q) between the quantization value q and the frequency coefficient C is then found, to make judgment using the following equations (4) or (5), and extract the value of the bit b of the embedded digital information:

$$0 \leq p < h/2 \rightarrow b=0 \quad (4)$$

$$h/2 \leq p < h \rightarrow b=1 \quad (5)$$

In the technique by Nakamura et al., therefore, a third person has little clue as to the embedded digital information by concealing the position where the frequency coefficient C, out of the frequency coefficients in the low frequency components excluding the DC coefficient, is embedded using a pseudo-random number string, and by introducing an error component caused by requantization using the parameter h.

In the earlier application, however, the digital information is embedded in all the MRA components which are the lowest frequency components, so that the following problems sill remain:

1. As already described, the visual characteristics of a human being generally have the property of easily overlooking noises in a high frequency region but detecting noises in a low frequency region. Further, a flat part of an image signal has energy almost concentrated in an MRA component (low frequency component), and a detailed part of the image signal corresponds to an MRR component (high frequency component). That is, in output components in discrete wavelet transform, if the MRA component corresponding to the flat part of the image signal is corrected by an embedding operation no matter how slight the correction is, the quality of the image is degraded.

2. The MRA component is divided into a plurality of blocks in a predetermined block size, and digital information is embedded in all the blocks. When a embedding algorithm is made public one, therefore, the embedded digital information may be decoded.

On the other hand, in the technique by Nakamura et al., the digital information is embedded in all the blocks, so that the quality of the image is degraded in the block corresponding to a flat part of the digital image signal. Further, the digital information is only embedded in one frequency coefficient C in the low frequency components. Accordingly, the embedded digital information may be lost against a third person's attempts for unauthorized utilization (e.g., image compression).

SUMMARY OF THE INVENTION

Therefore, an object of the present invention is to provide an apparatus for and a method of embedding and extracting digital information in an MRA component corresponding to a detailed part of an image signal or MRR components in lower frequency bands (deeper hierarchical signal) such that the quality of an image is hardly degraded at the time of decoding, and providing a third person with little clue as to the embedded digital information.

Another object of the present invention is to provide an apparatus for and a method of embedding and extracting digital information, in which digital information is embedded using the average value of a plurality of frequency coefficients out of frequency coefficients in low frequency components excluding a DC component, digital information is embedded in a block corresponding to a detailed part of an image signal such that the quality of an image is hardly degraded at the time of decoding, and the embedded digital information also remains without being lost (generally, this is called "the digital information has resistance") against a third person's attempts for unauthorized utilization.

Still another object of the present invention is to provide a digital watermark system having an affinity for MPEG (Moving Picture Experts Group)/JPEG (Joint Photographic Experts Group) which is the existing image coding.

The present invention has the following features to attain objects above.

A first aspect is directed to a digital information embedding apparatus for embedding inherent digital information in a digital image signal, comprising:

a band division portion for dividing the digital image signal into a plurality of frequency bands to obtain wavelet coefficients using either discrete wavelet transformation or sub-band division;

a block division for dividing the frequency band in which the digital information is to be embedded (hereinafter referred to as embedding object region) out of the frequency bands obtained by the division into a plurality of blocks in a predetermined block size;

a key generation portion for respectively generating secondary keys having different values from a key having a predetermined value using a predetermined function with respect to information composing the digital information;

an information embedding portion for specifying the block in the embedding object region on the basis of each of the generated secondary keys, and respectively embedding the corresponding information composing the digital information in the wavelet coefficients in the specified block in the embedding object region; and a band synthesis portion for reconstructing a digital image signal in which the digital information has been embedded using the embedding object region after the embedding processing and the plurality of frequency bands other than the embedding object region.

As described above, in the first aspect, the digital information is embedded in the block specified on the basis of the secondary key. Consequently, a third person not knowing a method of generating the secondary key has little clue as to the embedded digital information.

A second aspect is directed to a digital information embedding apparatus for embedding inherent digital information in a digital image signal, comprising:

a band division portion for dividing the digital image signal into a plurality of frequency bands to obtain wavelet coefficients using either discrete wavelet transformation or sub-band division;

a block division portion for dividing the frequency band in which the digital information is to be embedded (embedding object region) out of the frequency bands obtained by the division into a plurality of blocks in a predetermined block size;

a key generation portion for respectively generating secondary keys having different values from a key having a predetermined value using a predetermined function with respect to information composing the digital information;

an energy analysis portion for specifying the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region;

an information embedding portion for controlling the key generation portion such that another secondary key is generated when the energies are less than a predetermined set value, and respectively embedding the corresponding information composing the digital information in the wavelet coefficients in the specified block in the embedding object region when the energies are not less than the predetermined set value; and a band synthesis portion for reconstructing a digital image signal in which the digital information has been embedded using the embedding object region after the embedding processing and the plurality of frequency bands other than the embedding object region.

As described above, in the second aspect, the digital information is embedded by judging the energies of the wavelet coefficients in each of the plurality of frequency bands, other than the embedding object region, corresponding to the position of the block specified on the basis of the secondary key. Consequently, the quality of an image is hardly degraded at the time of decoding, and a third person has little clue as to the embedded digital information.

According to a third aspect, further to the second aspect, the apparatus further comprises a coefficient multiplication portion for multiplying the wavelet coefficients whose energies have been calculated by a predetermined value U (U is a real number of not less than one) when the energies are in a range of not less than the predetermined set value nor more than a predetermined upper limit value, white multiplying the wavelet coefficients by a predetermined value L (L is a real number of not more than one) when the energies are in a range of less than the predetermined set value and not less than a predetermined lower limit value.

As described above, in the third aspect, only when the energies are close to a predetermined set value, the wavelet coefficients are multiplied by a predetermined value in the second aspect. Accordingly, it is possible to prevent erroneous detection/incomplete detection in a case where the energies are not less than the set value against a third person's attempts for unauthorized utilization (for example, image compression). Consequently, the embedded digital information can be accurately extracted. Moreover, the quality of an image is hardly degraded and a third person has little clue as to the embedded digital information.

A fourth aspect is directed to a digital information extracting apparatus for extracting inherent digital information embedded by a particular apparatus in wavelet coefficients in a particular frequency band (embedding object region) obtained by a dividing a digital image signal using either discrete wavelet transformation or sub-band division. The apparatus in accordance with the fourth aspect comprises:

a band division portion, receiving the reconstructed digital image signal outputted by the particular apparatus, for dividing the digital image signal into a plurality of frequency bands to obtain wavelet coefficients using either discrete wavelet transformation or sub-band division;

a block division portion for dividing the embedding object region out of the frequency bands obtained by the division into a plurality of blocks in a predetermined block size;

a key generation portion for respectively generating secondary keys having different values from a key having a predetermined value using a predetermined function with respect to information composing the digital information; and an information detection portion for specifying the block in the embedding object region on the basis of each of the generated secondary keys, and respectively detecting the information composing the embedded digital information from the wavelet coefficients in the specified block in the embedding object region.

As described above, in the fourth aspect, the embedded digital information is detected from the wavelet coefficients in the block specified on the basis of the secondary key. Consequently, a third person not knowing a method of generating the secondary key has little clue as to the embedded digital information.

A fifth aspect is directed to a digital information extracting apparatus for extracting inherent digital information embedded by a particular apparatus in wavelet coefficients in a particular frequency band (hereinafter referred to as embedding object region) obtained by dividing a digital image signal using either discrete wavelet transformation or sub-band division. The apparatus in accordance with the fifth aspect comprises:

a band division portion, receiving the reconstructed digital image signal outputted by the particular apparatus, for dividing the digital image signal into a plurality of frequency bands to obtain wavelet coefficients using either discrete wavelet transformation or sub-band division;

a block division portion for dividing the embedding object region out of the frequency bands obtained by the division into a plurality of blocks in a predetermined block size;

a key generation portion for respectively generating secondary keys having different values from a key having a predetermined value using a predetermined function with respect to information composing the digital information;

an energy analysis portion for specifying the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region; and an information detection portion for respectively detecting the information composing the embedded digital information from the wavelet coefficients, in the block in the embedding object region, whose energies are not less than a predetermined set value.

As described above, in the fifth aspect, the energies of the wavelet coefficients in each of the plurality of frequency bands, other than the embedding object region, corresponding to the position of the block specified on the basis of the secondary key are judged, to detect the embedded digital information. Consequently, a third person not knowing a method of generating the secondary key has little clue as to the embedded digital information.

A sixth aspect is directed to a digital information embedding apparatus for embedding inherent digital information in a digital image signal, comprising:

a block division portion for dividing the digital image signal into a plurality of blocks each composed of a plurality of predetermined pixels;

a frequency transform portion for frequency-transforming each of the blocks obtained by the division, to calculate frequency coefficients;

a coefficient calculation portion for selecting a particular frequency coefficient string out of the calculated frequency coefficients, and finding the absolute average value M and the energy of the frequency coefficient string;

a quantization portion for subjecting, with respect to the frequency coefficient string whose energy is not less than a predetermined threshold value, the found absolute average value M to linear quantization to calculate a quantization value using a predetermined quantization step-size Q (Q is an integer of not 10 less than one);

a signal replacement portion for replacing the quantization value with a predetermined value on the basis of the quantization value and the value of the digital information;

a coefficient correction portion for subjecting the replaced quantization value to inverse linear quantization using the quantization step-size Q, to calculate an average value M', and correcting the frequency coefficient string using a difference DM (=M'−M) between the average value M' and the absolute average value M; and an inverse frequency transform portion for subjecting the plurality of blocks after the correction to inverse frequency transformation, to reconstruct a digital image signal in which the digital information has been embedded.

As described above, in the sixth aspect, the energy of the frequency coefficient string is judged, to embed the digital information. Consequently, the quality of an image is hardly degraded at the time of decoding, and the embedded digital information can be prevented from being lost against a third person's attempts for unauthorized utilization.

According to a seventh aspect, further to the sixth aspect, the coefficient calculation portion selects the frequency coefficient string in low frequency components excluding a DC component.

As described above, in the seventh aspect, the digital information is embedded in the frequency coefficient string in the low frequency components in the vicinity of the DC component in the sixth aspect. Accordingly, the digital information can be more accurately extracted without being affected by an unauthorized user's attempts.

According to an eighth aspect, further to the sixth aspect, the coefficient portion adds a predetermined set value to the value of the difference DM when the quantization value is equal to a value of the threshold value divided by the quantization step-size Q.

As described above, in the eighth aspect, the value of the difference DM is operated in the sixth aspect, so that the quality of an image is hardly degraded at the time of decoding. Further, it is possible to prevent erroneous detection/incomplete detection in a case where the energy is not less than the threshold value against a third person's attempts for unauthorized utilization. Consequently, the embedded digital information can be more accurately extracted.

According to a ninth aspect, further to the sixth aspect, the coefficient correction portion corrects the frequency coefficient to zero when the value of the difference DM is negative and the absolute value of the frequency coefficient is smaller than the absolute value of the difference DM.

As described above, in the ninth aspect, when the absolute value of the frequency coefficient is smaller than the absolute value of the difference DM in the sixth aspect, it is impossible to make such correction that the absolute value of the frequency coefficient becomes smaller, so that the frequency coefficient is reduced to zero. Consequently, it is possible to reduce an error in case where the digital information is embedded using the absolute average value M of the plurality of frequency coefficients. Accordingly, the digital information can be more accurately extracted.

A tenth aspect is directed to a digital information extracting apparatus for extracting inherent digital information embedded by a particular apparatus in a particular frequency coefficient string obtained by dividing a digital image signal into blocks and subjecting each of the blocks to frequency transformation. The apparatus in accordance with the tenth aspect comprises:

a block division portion, receiving the digital image signal outputted by the particular apparatus, for dividing the digital image signal into a plurality of blocks each composed of a plurality of predetermined pixels in accordance with the block division performed by the particular apparatus;

a frequency transform portion for frequency-transforming each of the blocks obtained by the division to calculate frequency coefficients in accordance with the frequency transformation performed by the particular apparatus;

a coefficient calculation portion for selecting the particular frequency coefficient string out of the calculated frequency coefficients, and finding the absolute average value M and the energy of the frequency coefficient string in accordance with a method of the calculation performed by the particular apparatus;

a quantization portion for subjecting, with respect to the frequency coefficient, string whose energy is not less than a predetermined threshold value, the absolute average value M to linear quantization to calculate a quantization value using a quantization step-size Q used in the particular apparatus; and an information extraction portion for judging whether the quantization value is even or odd, and extracting the digital information embedded on the basis of the result of the judgment.

As described above, in the tenth aspect, as a result of extracting the absolute average value M of the particular frequency coefficient string, and calculating the quantization value of the absolute average value M of the frequency coefficient string using a predetermined method, the logical value of the embedded digital information is judged. Consequently, accurate digital information can be extracted without being affected by an unauthorized user's attempts.

An eleventh aspect is directed to a method of embedding inherent digital information in a digital image signal, comprising:

the step of dividing the digital image signal into a plurality of frequency bands to obtain wavelet coefficients using either discrete wavelet transformation transform or sub-band division;

the step of dividing the frequency band in which the digital information is to be embedded (embedding object region) out of the frequency bands obtained by the division into a plurality of blocks in a predetermined block size;

the step of respectively generating secondary keys having different values from a key having a predetermined value using a predetermined function with respect to information composing the digital information;

the steps of specifying the block in the embedding object region on the basis of each of the generated secondary keys, and respectively embedding the corresponding information composing the digital information in the wavelet coefficients in the specified block in the embedding object region; and the step of reconstructing a digital image signal in which the digital information has been embedded using the embedding object region after the embedding processing and the plurality of frequency bands other than the embedding object region.

As described above, in the eleventh aspect, the digital information is embedded in the block specified on the basis of the secondary key. Consequently, a third person not knowing a method of generating the secondary key has little clue as to the embedded digital information.

A twelfth aspect is directed to a method of embedding inherent digital information in a digital image signal, comprising:

the step of dividing the digital image signal into a plurality of frequency bands to obtain wavelet coefficients using either discrete wavelet transformation or sub-band division;

the step of dividing the frequency band in which the digital information is to be embedded (embedding object region) out of the frequency bands obtained by the division into a plurality of blocks in a predetermined block size;

the step of respectively generating secondary keys having different values from a key having a predetermined value using a predetermined function with respect to information composing the digital information;

the steps of specifying the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region;

the step of controlling the generating step such that another secondary key is generated when the energies are less than a predetermined set value;

the step of respectively embedding the corresponding information composing the digital information in the wavelet coefficients in the specified block in the embedding object region when the energy is not less than the predetermined set value; and the step of reconstructing a digital image signal in which the digital information has been embedded using the embedding object region after the embedding processing and the plurality of frequency bands other than the embedding object region.

As described above, in the twelfth aspect, the energies of the wavelet coefficients in each of the plurality of frequency bands, other than the embedding object region, corresponding to the position of the block specified on the basis of the secondary key is judged, to embed the digital information. Consequently, the quality of an image is hardly degraded at the time of decoding, and a third person has little clue as to the embedded digital information.

According to a thirteenth aspect, further to the twelfth aspect, the method further comprises:

the steps of multiplying the wavelet coefficients whose energies have been calculated by a predetermined value U when the energies are in a range of not less than the predetermined set value nor more than a predetermined upper limit value, while multiplying the wavelet coefficients by a predetermined value L when the energies are in a range of less than the predetermined set value and not less than a predetermined lower limit value.

As described above, in the thirteenth aspect, only when the energies are close to the predetermined set value in the twelfth aspect, the wavelet coefficients are multiplied by a predetermined value, thereby making it possible to prevent erroneous detection/incomplete detection in a case where the energies are not less than the set value against a third person's attempts for unauthorized utilization (for example, image compression). Consequently, the embedded digital information can be accurately extracted. Moreover, the quality of an image is hardly degraded, and the third person has little clue as to the embedded digital information.

A fourteenth aspect is directed to a method of extracting inherent digital information embedded by a particular apparatus in wavelet coefficients in a particular frequency band (embedding object region) obtained by dividing a digital image signal using either discrete wavelet transform or sub-band division. The method in accordance with the fourteenth aspect comprises:

the step of receiving a reconstructed digital image signal outputted by the particular apparatus, and dividing the digital image signal into a plurality of frequency bands to obtain wavelet coefficients using either discrete wavelet transformation or sub-band division;

the step of dividing the embedding object region out of the frequency bands obtained by the division into a plurality of blocks in a predetermined block size;

the step of respectively generating secondary keys having different values from a key having a predetermined value using a predetermined function with respect to information composing the digital information; and the steps of specifying the block in the embedding object region on the basis of each of the generated secondary keys, and respectively detecting the information composing the embedded digital information from the wavelet coefficients in the specified block in the embedding object region.

As described above, in the fourteenth aspect, the embedded digital information is detected from the wavelet coefficients in the block specified on the basis of the secondary key. Consequently, a third person not knowing a method of generating the secondary key has little clue as to the embedded digital information.

A fifteenth aspect is directed to a method of extracting inherent digital information embedded by a particular apparatus in wavelet coefficients in a particular frequency band (embedding object region) obtained by dividing a digital image signal using either discrete wavelet transformation or sub-band division. The method in accordance with the fifteenth aspect comprises:

the step of receiving a reconstructed digital image signal outputted by the particular apparatus, and dividing the digital image signal into a plurality of frequency bands to obtain wavelet coefficients using either discrete wavelet transformation or sub-band division;

the step of dividing the embedding object region out of the frequency bands obtained by the division into a plurality of blocks in a predetermined block size;

the step of respectively generating secondary keys having different values from a key having a predetermined value using a predetermined function with respect to information composing the digital information;

the steps of specifying the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region; and the step of respectively detecting the information composing the embedded digital information from the wavelet coefficients, in the block in the embedding object region, whose energies are not less than a predetermined set value. of the wavelet coefficients in the plurality of frequency bands, other than the embedding object region, corresponding to the position of the block specified on the basis of the secondary key is judged, to detect the embedded digital information. Consequently, the a third person not knowing a method of generating the secondary key has little clue as to the embedded digital information.

A sixteenth aspect is directed to a method of embedding inherent digital information in a digital image signal, comprising:

the step of dividing the digital image signal into a plurality of blocks each composed of a plurality of predetermined pixels;

the steps of frequency-transforming each of the blocks obtained by the division, to calculate frequency coefficients;

the steps of selecting a particular frequency coefficient string out of the calculated frequency coefficients, and finding the absolute average value M and the energy of the frequency coefficient string;

the step of subjecting, with respect to the frequency coefficient string whose energy is not less than a predetermined threshold value, the found absolute average value M to linear quantization to calculate a quantization value using a predetermined quantization step-size Q;

the steps of replacing the quantization value with a predetermined value on the basis of the quantization value and the value of the digital information;

the steps of subjecting the replaced quantization value to inverse linear quantization to calculate an average value M' using the quantization step-size Q, and correcting the frequency coefficient string using a difference DM between the average value M' and the absolute average value M; and the step of subjecting the plurality of blocks after the correction to inverse frequency transformation, to reconstruct a digital image signal in which the digital information has been embedded.

As described above, in the sixteenth aspect, the energy of the frequency coefficient string is judged, to embed the digital information. Consequently, the quality of an image is hardly degraded at the time of decoding, and the embedded digital information can be prevented from being lost against a third person's attempts for unauthorized utilization.

According to a seventeenth aspect, further to the sixteenth aspect, in the finding steps, the frequency coefficient string in low frequency components excluding a DC component is selected.

As described above, in the seventeenth aspect, the digital information is embedded in the frequency coefficient string in the low frequency components in the vicinity of the DC component in the sixteenth aspect. Accordingly, the digital information can be more accurately extracted without being affected by an unauthorized user's attempts.

According to an eighteenth aspect, further to the sixteenth aspect, in the correcting steps, a predetermined set value is added to the value of the different DM when the quantization value is equal to a value of the threshold value divided by the quantization step-size Q.

As described above, in the eighteenth aspect, the value of the difference DM is operated in the sixteenth aspect, so that the quality of an image is hardly degraded at the time of decoding. Further, it is possible to prevent erroneous detection/incomplete detection in a case where the energy is not less than the threshold value against a third period's attempts for unauthorized utilization. Consequently, the embedded digital information can be more accurately extracted.

According to a nineteenth aspect, further to the sixteenth aspect, in the correcting steps, the frequency coefficient is corrected to zero when the value of the difference DM is negative and the absolute value of the frequency coefficient is smaller than the absolute value of the different DM.

As described above, in the nineteenth aspect, when the absolute value of the frequency coefficient is smaller than the absolute value of the difference DM in the sixteenth aspect, it is impossible to make such correction that the absolute value of the frequency coefficient becomes smaller, so that the frequency coefficient is reduced to zero. Consequently, it is possible to reduce an error in a case where the digital information is embedded using the absolute average value M of the plurality of frequency coefficients. Accordingly, the digital information can be more accurately extracted.

A twentieth aspect is directed to a method of extracting inherent digital information embedded by a particular apparatus in a particular frequency coefficient string obtained by dividing a digital image signal into blocks and subjecting each of the blocks to frequency transformation. The method in accordance with the twentieth aspect comprises:

the step of receiving the digital image signal outputted by the particular apparatus, and dividing the digital image signal into a plurality of blocks each composed of a plurality of predetermined pixels in accordance with the block division performed by the particular, apparatus;

the step of frequency-transforming each of the blocks obtained by the division to calculate frequency coefficients in accordance with the frequency transform performed by the particular apparatus;

the steps of selecting the particular frequency coefficient string out of the calculated frequency coefficients, and finding the absolute average value M and the energy of the frequency coefficient string in accordance with a method of the calculation performed by the particular apparatus;

the steps of subjecting, with respect to the frequency coefficient string whose energy is not less than a predetermined threshold value, the absolute average value M to linear quantization to calculate a quantization value using a quantization step-size Q used in the particular apparatus; and the steps of judging whether the quantization value is even or odd, and extracting the digital information embedded on the basis of the result of the judgment.

As described above, in the twentieth aspect, as a result of extracting the absolute average value M of the particular frequency coefficient string, and calculating the quantization value of the absolute average value M of the frequency coefficient string using a predetermined method, the logical value of the embedded digital information is judged. Consequently, the digital information can be accurately extracted without being affected by an unauthorized user's attempts.

A twenty-first aspect is directed to a recording medium having a program executed in a computer recorded thereon, the program being operable to instruct the computer to:

divide the digital image signal into a plurality of frequency bands to obtain wavelet coefficients using either discrete wavelet transformation or sub-band division;

divide the frequency band in which the digital information is to be embedded (embedding object region) out of the frequency bands obtained by the division into a plurality of blocks in a predetermined block size;

respectively generate secondary keys having different values from a key having a predetermined value using a predetermined function with respect to information composing the digital information;

specify the block in the embedding object region on the basis of each of the generated secondary keys, and respectively embed the corresponding information composing the digital information in the wavelet coefficients in the specified block in the embedding object region; and reconstruct a digital image signal in which the digital information has been embedded using the embedding object region after the embedding processing and the plurality of frequency bands other than the embedding object region.

A twenty-second aspect is directed to a recording medium having a program executed in a computer recorded thereon, the program being operable to instruct the computer to:

divide the digital image signal into a plurality of frequency bands to obtain wavelet coefficients using either discrete wavelet transformation or sub-band division;

divide the frequency band in which the digital information is to be embedded (embedding object region) out of the frequency bands obtained by the division into a plurality of blocks in a predetermined block size;

respectively generate secondary keys having different values from a key having a predetermined value using a predetermined function with respect to information composing the digital information;

specify the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region;

control the generating step such that another secondary key is generated when the energies are less than a predetermined set value;

respectively embed the corresponding information composing the digital information in the wavelet coefficients in the specified block in the embedding object region when the energies are not less than the predetermined set value; and reconstruct a digital image signal in which the digital information has been embedded using the embedding object region after the embedding processing and the plurality of frequency bands other than the embedding object region.

According to a twenty-third aspect, further to the twenty-second aspect, the program being further operable to instruct a computer to multiply the wavelet coefficients whose energies have been calculated by a predetermined value U when the energies are in a range of not less than the predetermined set value nor more than a predetermined upper limit value, while multiplying the wavelet coefficients by a predetermined value L when the energies are in a range of less than the predetermined set value and not less than a predetermined lower limit value.

A twenty-fourth aspect is directed to a recording medium having a program executed in a computer recorded thereon, the program being operable to instruct the computer to:

receive, with respect to inherent digital information embedded by a particular apparatus in wavelet coefficients in a particular frequency band (embedding object region) obtained by dividing, a digital image signal using either discrete wavelet transform or sub-band division, a reconstructed digital image signal outputted by the particular apparatus, and divide the digital image signal into a plurality of frequency bands to obtain wavelet coefficients using either discrete wavelet transformation or sub-band division;

divide the embedding object region out of the frequency bands obtained by the division into a plurality of blocks in a predetermined block size;

respectively generate secondary keys having different values from a key having a predetermined value using a predetermined function with respect to information composing the digital information; and specify the block in the embedding object region on the basis of each of the generated secondary keys, and respectively detect the information composing the embedded digital information from the wavelet coefficients in the specified block in the embedding object region.

A twenty-fifth aspect is directed to a recording medium having a program executed in a computer recorded thereon, the program being operable to instruct the computer to:

receive with respect to inherent digital information embedded by a particular apparatus in wavelet coefficients in a particular frequency band (embedding object region) obtained by dividing, a digital image signal using either discrete wavelet transform or sub-band division, a reconstructed digital image signal outputted by the particular apparatus, and divide the digital image signal into a plurality of frequency bands to obtain wavelet coefficients using either discrete wavelet transformation or sub-band division;

divide the embedding object region out of the frequency bands obtained by the division into a plurality of blocks in a predetermined block size;

respectively generate secondary keys having different values from a key having a predetermined value using a predetermined function with respect to information composing the digital information;

specify the block in the embedding object region on the basis of each of the generated secondary keys, and respectively calculate the energies of the wavelet coefficients in each of the plurality of frequency bands, other than the embedding object region, corresponding to the same space representation region as the position of the specified block in the embedding object region; and respectively detect the information composing the embedded digital information from the wavelet coefficients, in the block in the embedding object region, whose energies are not less than a predetermined set value.

A twenty-sixth aspect is directed to a recording medium having a program executed in a computer recorded thereon, the program being operable to instruct the computer to:

divide a digital image signal into a plurality of blocks each composed of a plurality of predetermined pixels;

frequency-transform each of the blocks obtained by the division, to calculate frequency coefficients;

select a particular frequency coefficient string out of the calculated frequency coefficients, and find the absolute average value M and the energy of the frequency coefficient string;

subject with respect to the frequency coefficient string whose energy is not less than a predetermined threshold value, the found absolute average value M to linear quantization to calculate a quantization value using a predetermined quantization step-size Q;

replace the quantization value with a predetermined value on the basis of the quantization value and the value of the digital information;

subject the replaced quantization value to inverse linear quantization to calculate an average value M' using the quantization step-size Q, and correcting the frequency coefficient string using a difference DM between the average value M' and the absolute average value M; and subject the plurality of blocks after the correction to inverse frequency transformation, to reconstruct a digital image signal in which the digital information has been embedded.

According to a twenty-seventh aspect, further to the twenty-sixth aspect, in finding, the frequency coefficient string in low frequency components excluding a DC component is selected.

According to a twenty-eighth aspect, further to the twenty-sixth aspect, in correcting, a predetermined set value is added to the value of the difference DM when the quantization value is equal to a value of the threshold value divided by the quantization step-size Q.

According to a twenty-ninth aspect, further to the twenty-sixth aspect, in correcting, the frequency coefficient is corrected to zero when the value of the difference DM is negative and the absolute value of the frequency coefficient is smaller than the absolute value of the difference DM.

A thirtieth aspect is directed to a recording medium having a program executed in a computer recorded thereon, the program being operable to instruct the computer to:

receive with respect to inherent digital information embedded by a particular apparatus in a particular frequency coefficient string, obtained by dividing a digital image signal into blocks and subjecting each of the blocks to frequency transformation, a reconstructed digital image signal outputted by the particular apparatus, and divide the digital image signal into a plurality of blocks each composed of a plurality of predetermined pixels in accordance with the block division performed by the particular apparatus;

frequency-transform each of the blocks obtained by the division to calculate frequency coefficients in accordance with the frequency transformation performed by the particular apparatus;

select the particular frequency coefficient string out of the calculated frequency coefficients, and find the absolute average value M and the energy of the frequency coefficient string in accordance with a method of the calculation performed by the particular apparatus;

subject with respect to the frequency coefficient string whose energy is not less than a predetermined threshold value, the absolute average value M to linear quantization to calculate a quantization value using a quantization step-size Q used in the particular apparatus; and judge whether the quantization value is even or odd, and extract the digital information embedded on the basis of the result of the judgment.

As described above, the twenty-first to thirtieth aspects are directed to the recording medium having the program for carrying out a method of embedding and extracting digital information in the eleventh to twentieth aspects recorded thereon. This corresponds to the supply of the method of embedding and extracting digital information in the eleventh to twentieth aspects to the existing apparatus in the form of software.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of a digital information embedding apparatus 1A according to a first embodiment of the present invention;

FIG. 11 is a block diagram showing the configuration of a digital information extracting apparatus 1B according to a second embodiment of the present invention;

FIG. 12 is a flowchart showing processing performed by a block division portion 12, a key generation portion 13, an energy analysis portion 14, and an information detection portion 21 shown in FIG. 11;

FIG. 16 is a diagram showing an example of processing performed by a block division portion 41 and a frequency transform portion 42 shown in FIG. 15;

Figure 2:
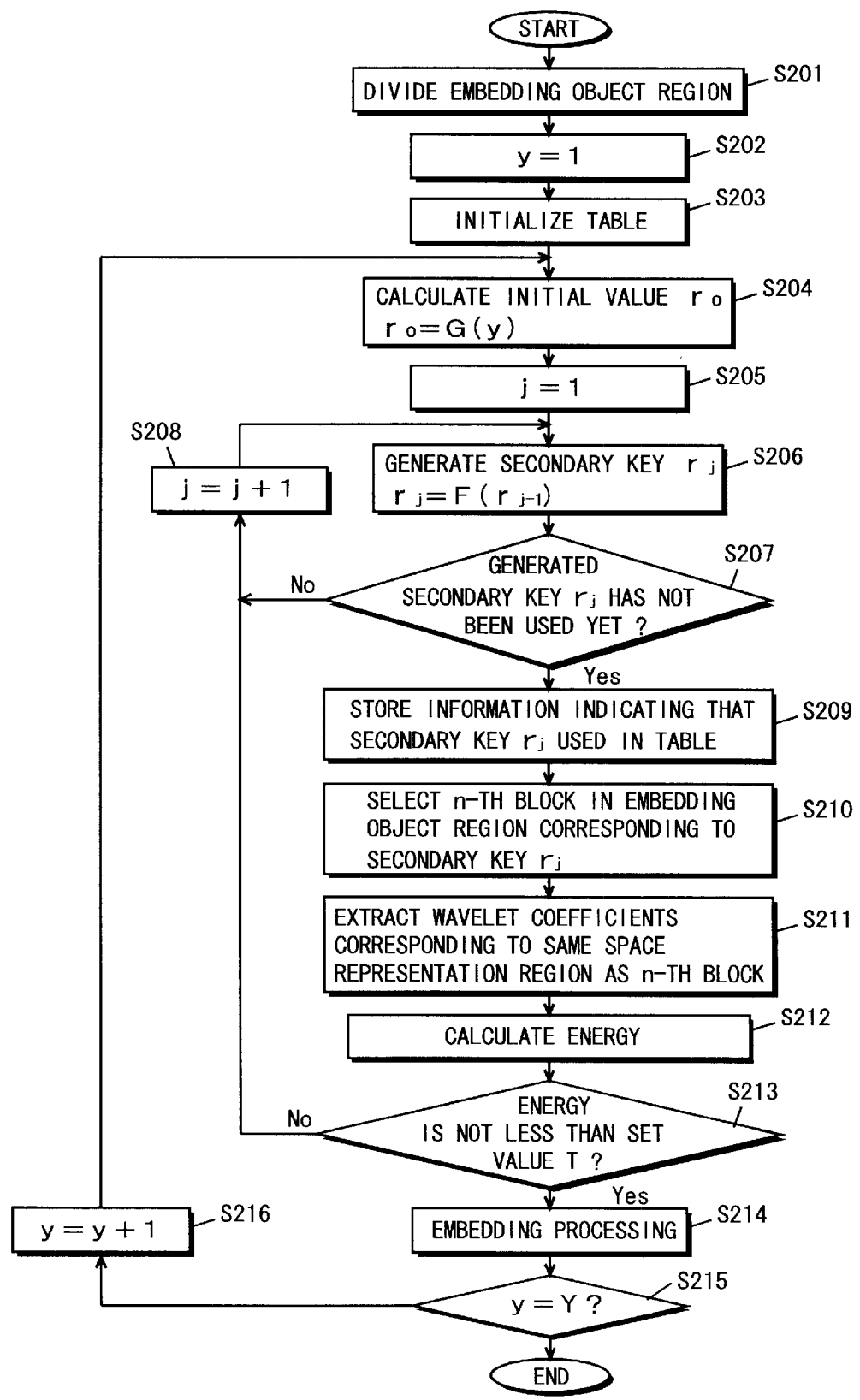
FIG. 2 is a flowchart showing processing performed by a block division portion 12, a key generation portion 13, an energy analysis portion 14, and an information embedding portion 15 shown in FIG. 1.

DESCRIPTION OF THE PREFERRED EMBODIMENTS (First Embodiment)

FIG. 1 is a block diagram showing the configuration of a digital information embedding apparatus according to a first embodiment of the present invention. In FIG. 1, a digital information embedding apparatus 1A according to the first embodiment comprises a band division portion 11, a block division portion 12, a key generation portion 13, an energy analysis portion 14, an information embedding portion 15, and a band synthesis portion 16. The band division portion 11 in the digital information embedding apparatus 1A according to the first embodiment has the same configuration as the band dividing device 11 described in the prior art and hence, the description thereof will be partially omitted.

The band division portion 11 receives a digitized image signal 71, and divides the image signal 71 into signals in ten frequency bands, i.e., an LL3 signal, LHi signals, HLi signals, and HHi signals (i=1 to 3; the same is true for the following) by discrete wavelet transform, to calculate wavelet coefficients in each of the signals. The block division portion 12 divides, in a predetermined size, a frequency band in which digital information is to be embedded (hereinafter referred to as embedding object region) out of the frequency bands obtained by the division carried out in the band division portion 11. The key generation portion 13 generates a secondary key from a key having a predetermined value using a predetermined function, and generates and stores key information indicating whether or not the generated secondary key is used for embedding. The energy analysis portion 14 specifies a corresponding block on the basis of the secondary key generated by the key generation portion 13, and calculates the energies of the wavelet coefficients in each of the frequency bands, other than the embedding object region, corresponding to the same space representation region as the position of the specified block. The information embedding portion 15 embeds one of bits composing digital information into the wavelet coefficients in the specified block in the LL3 signal if the energies calculated by the energy analysis portion 14 are not less than a predetermined set value T. The band synthesis portion 16 synthesizes the LL3 signal which has been subjected to the embedding processing and the signals in the other frequency bands, to reconstruct an image signal 72.

Referring now to FIGS. 2 to 5, a digital information embedding method which is carried out by the digital information embedding apparatus 1A according to the first embodiment is described stepwise. A case where the embedding object region is the LL3 signal (MRA component), and the frequency bands other than the embedding object region are MRR components will be exemplarily described.

Figures 3, 4:
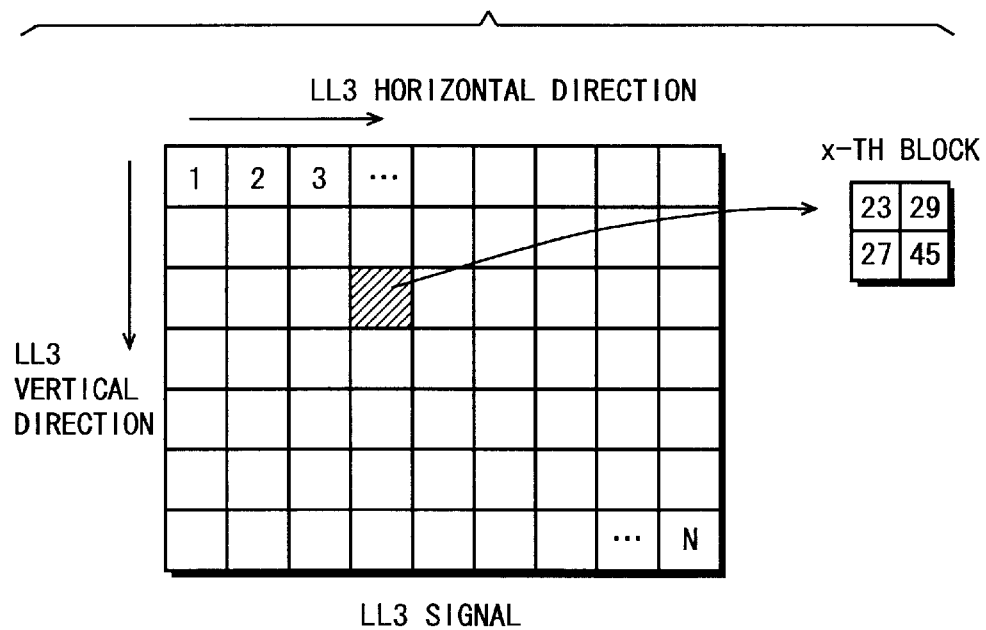
FIG. 3 is a diagram showing an example of blocks obtained by dividing an LL3 signal.
FIG. 4 is a diagram showing an example of a table storing key information representing whether or not a secondary key is used.
Figure 5:
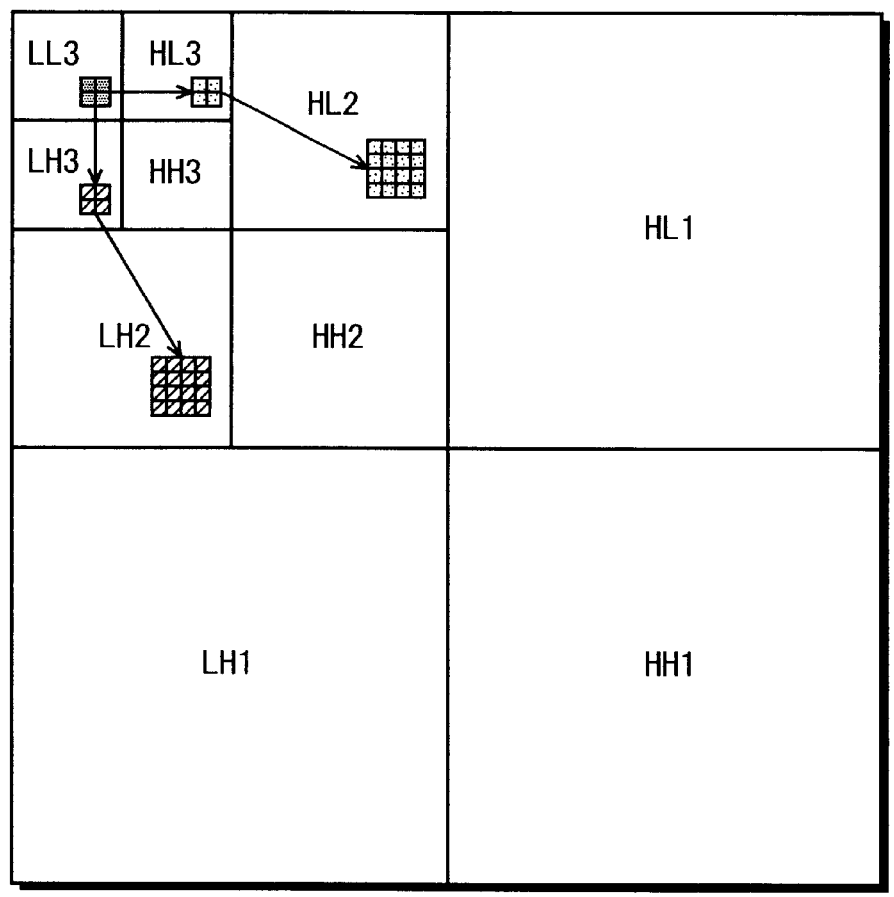
FIG. 5 is a diagram showing an example of the positional relationship between a block in an LL3 signal and MRR components corresponding to the same space representation region as the position of the block.

FIG. 2 is a flowchart showing processing performed by the block division portion 12, the key generation portion 13, the energy analysis portion 14, and the information embedding portion 15 shown in FIG. 1. FIG. 3 is a diagram showing an example of blocks obtained by dividing the LL3 signal. FIG. 3 illustrates, in a case where the LL3 signal is divided into blocks of a 2×2 size, four wavelet coefficients in the x-th block. FIG. 4 is a diagram showing an example of a table storing key information representing whether or not a secondary key is used. FIG. 5 is a diagram showing an example of the positional relationship between a block in the LL3 signal and MRR components corresponding to the same space representation region as the position of the block. In the following description, digital information to be embedded in a digital image shall be a bit stream obtained by binary-coding the name of a copyright holder, the date of creation, and so forth.

Referring to FIG. 2, the block division portion 12 first divides the LL3 signal, which is the embedding object region, outputted by the band division portion 11 into first to N-th (N is an integer of not less than two; the same is true for the following) blocks in a predetermined block size (step S201). The number of blocks N obtained by the division may be not less than the number Y of logical values of digital information to be embedded. The size of the block may be an arbitrary size other than the 2×2 size illustrated in FIG. 3. The shape of the block size need not be a square such as a regular square or a rectangle, and may be another shape (for example, triangle or rhombus).

The key generation portion 13 then takes the value of a counter y representing the bit position of information composing the digital information to be embedded (y takes a value in a range from one to the final bit Y of the digital information; the same is true for the following) as "1" (step S202). The key generation portion 13 initializes a table storing key information indicating whether or not a secondary key is used for embedding by "flag 0" (step S203). "Flag 1" is stored in a portion, corresponding to the used secondary key, of the table (that is, a flag is set) at the step S209, described later. The key generation portion 13 then calculates an initial value $r_0$ based on the value of y using a predetermined function G (step S204). The function G is most preferably set such that initial values $r_0$ in cases where y=1 to y=Y take integers which differ from one another in accordance with a predetermined rule. The key generation portion 13 takes a counter j (j=1 to N; the same is true for the following) for designating the secondary key ass "1" (step S205). The key generation portion 13 generates a secondary key $r_j$ from a key $r_{j-1}$ using a predetermined function F (step S206). The function F is most preferably set such that each of the generated secondary keys $r_1$ to $r_N$ takes a value in a range of 1 to N in accordance with a predetermined rule. In the first flow, the key generation portion 13 generates a secondary key $r_1$ from the key $r_0$ which is an initial value.

Thereafter, the key generation portion 13 refers to the table (the presence or absence of "flag 1"), to judge whether or not the secondary key $r_j$ generated at the foregoing step S206 has already been used for embedding processing (step S207). At the step S207, when the secondary key $r_j$ is judged to have been used, the key generation portion 13 increments the value of the counter j by "1" the processing at the step S206 and the subsequent steps are repeated in order to generate another secondary key (step 5208). On the other hand, at the foregoing step S207, when the secondary key $r_j$ is judged not to have been used yet, the key generation portion 13 records information indicating that the secondary key $r_j$ is used for digital information embedding processing by storing "flag 1" in a corresponding portion of the table (setting a flag) (step S209) (FIG. 4). By the processing, different blocks are subjected to embedding processing with respect to respective information representing the first to N-th bits comprising the digital information. In the first flow, "flag 1" is not stored in the table, so that the judgment at the step S207 is "Yes".

The energy analysis portion 14 then selects the block, corresponding to the value of the secondary key $r_j$, out of the first to N-th blocks in the LL3 signal (MRA component) obtained by the division at the foregoing step S201 (step S210). For example, when the value of the secondary key $r_j$ is x, the energy analysis portion 14 selects the x-th block in the LL3 signal (FIG. 3). After the selection, the energy analysis portion 14 extracts wavelet coefficients in the frequency band, other than the embedding object region, i.e., the MRR component, corresponding to the same space representation region as the position of the selected block (step S211). Wavelet coefficients in an MRR component corresponding to the same space representation region as the block position in an MRA component means signals in each hierarchy of an MRR component representing the same pixel as a pixel in the block position in an MRA component. In the present invention, it is most preferable to extract and use wavelet coefficients in only a deeper hierarchical signal. For example, in FIG. 5, the energy analysis portion 14 extracts a total of 40 pixels, i.e., four pixels by the LH3 signal and the HL3 signal which are a third hierarchical signal and for 16 pixels by the HL2 signal and the HL2 signal which are a second hierarchical signal.

The energy analysis portion 14 then calculates the energies of the wavelet coefficients in the MRR component which are extracted at the foregoing step S211 (step S212). Used for the calculation of the energies is a method of finding the sum of the absolute amplitude values of the extracted wavelet coefficients, a method of finding the sum of the squares of the extracted wavelet coefficients, or a method of finding the dispersion of the extracted wavelet coefficients, for example. The information embedding portion 15 then judges whether or not the energies calculated at the foregoing step S212 are not less than a predetermined set value T (step S213). The set value T is a threshold value for judging whether or not the embedding of digital information is hardly degraded the quality of an image. Consequently, the set value T is not uniquely determined but can be suitably and arbitrarily set in correspondence with the purpose of use of the apparatus and the level of an image signal handled by the apparatus, for example. By the processing, embedding processing can be performed only for the block which does not greatly degrade the quality of the image.

When the energies are judged as being not less than the set value T at the foregoing step S213, the information embedding portion 15 embeds information (logical value) corresponding to the y-th bit of the digital information in the wavelet coefficients in the selected block in the LL3 signal (step S214). The embedding processing is performed using the above-mentioned embedding method (the earlier application, for example). Contrary to this, when the energies are judged as being less than the set value T at the foregoing step S213, it is judged that the digital information should not be embedded in the block, and the value of the counter j is incremented by "1" and then the processing at the step S206 and the subsequent steps is repeated in order to generate another secondary key (step S208).

After the embedding processing of the information corresponding to the y-th bit is terminated, the information embedding portion 15 judges whether or not the digital information has been embedded, that is, embedding processing of the information corresponding to the first to Y-th bits has been performed (step S215). When the embedding processing of the information corresponding to the first to Y-th bits is judged as not being performed at the step S215, the information embedding portion 15 increments the value of the counter y by "1" in order to proceed to embedding processing of the information corresponding to the subsequent (y+1)-th bit (step S216). Thereafter, the program is returned to the foregoing step S204, to repeatedly perform the same processing. On the other hand, when the information corresponding to the first to Y-th bits is judged as being embedded at the foregoing step S215, the embedding processing is terminated.

Figure 6:
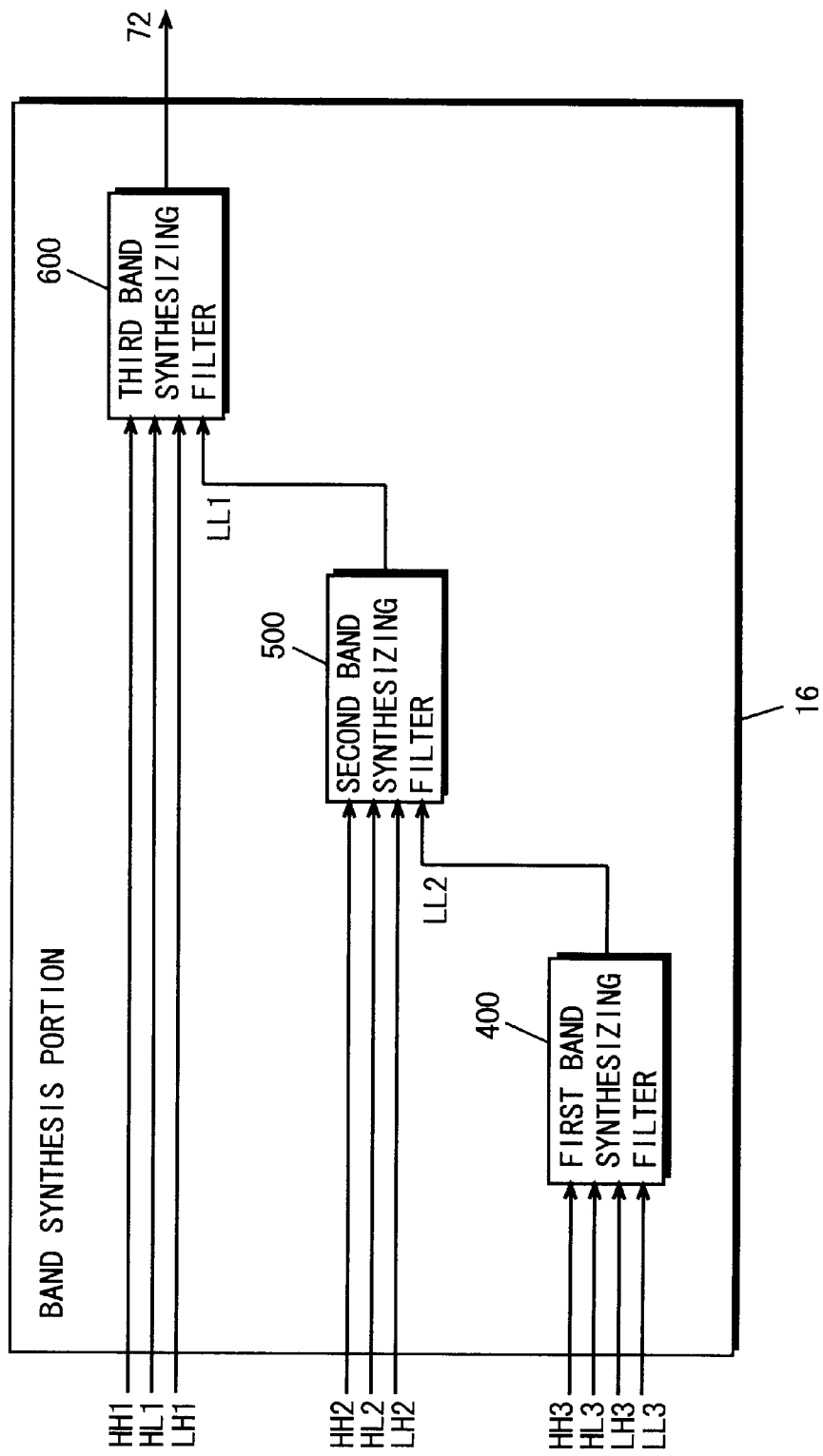
FIG. 6 is a block diagram showing an example of the detailed configuration of a band synthesis portion 16 shown in FIG. 1.

Processing performed by the band synthesis portion 16 is described with reference to FIGS. 6 and 7. Briefly stated, the band synthesis portion 16 performs processing reverse to that performed by the band division portion 11. FIG. 6 is a block diagram showing an example of the detailed configuration of the band synthesis portion 16 shown in FIG. 1. In FIG. 6, the band synthesis portion 16 comprises first to third band synthesizing filters 400, 500 and 600, which are identical in configuration. Each of the first to third band synthesizing filters 400, 500 and 600 receives four frequency band signals, and synthesizes the signals, to output one signal.

The fist band synthesizing filter 400 receives the LL3 signal in which the digital information has been embedded, and an LH3 signal, an HL3 signal, and an HH3 signal, and synthesizes the signals to generate an LL2 signal. The second band synthesizing filter 500 receives the LL2 signal obtained by the synthesis, and an LH2 signal, an HL2 signal, and an HH2 signal, and synthesizes the signals to generate an LL1 signal. The third band synthesizing filter 600 receives the LL1 signal obtained by the synthesis, and an LH1 signal, an HL1 signal, and an HH1 signal, and synthesizes the signals to reconstruct an image signal 72.

Figure 7:
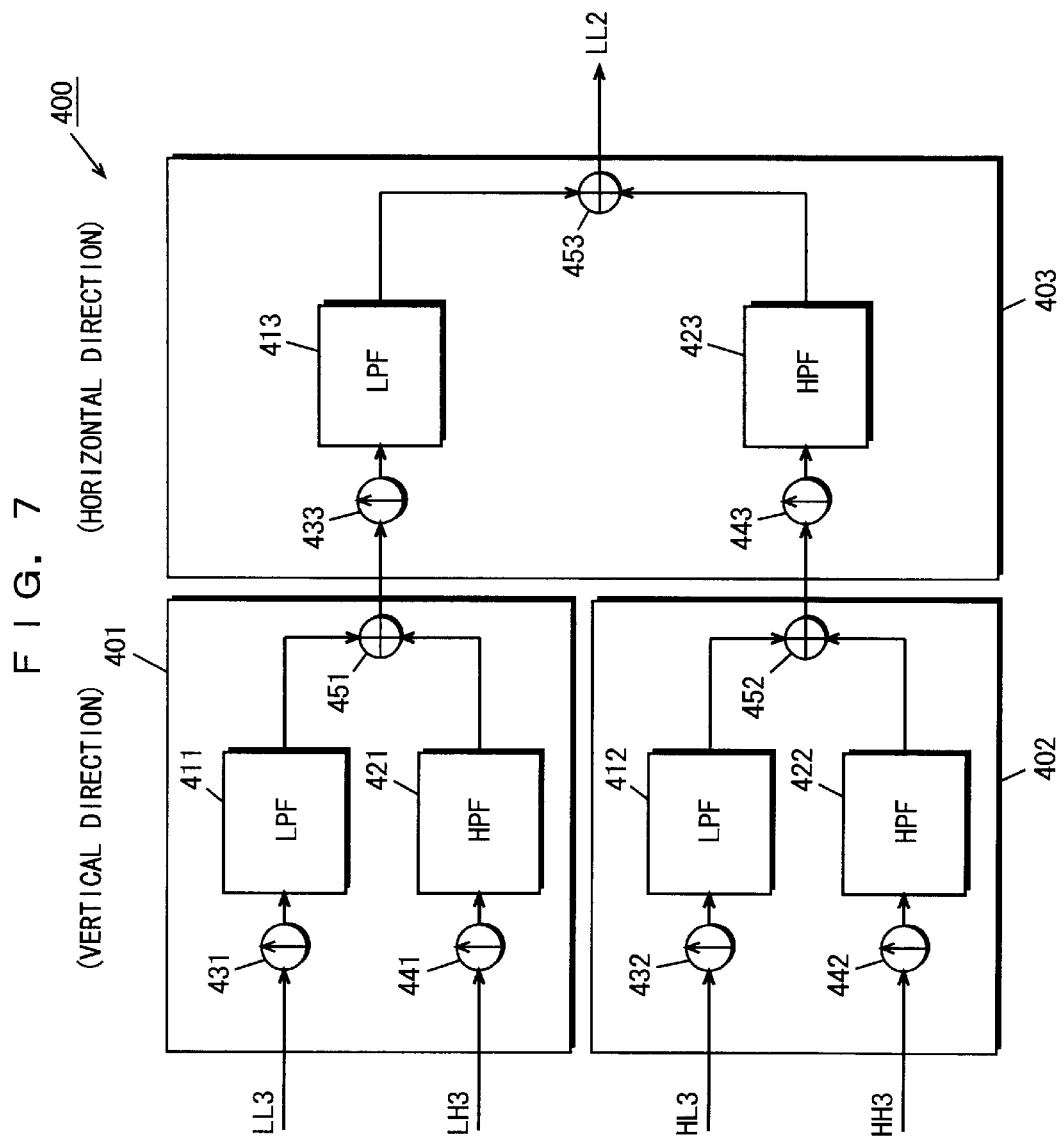
FIG. 7 is a block diagram showing an example of the detailed configuration of a band synthesizing filter 400 shown in FIG. 6.

FIG. 7 is a block diagram showing an example of the detailed configuration of the first band synthesizing filter 400 shown in FIG. 6. In FIG. 7, the first band synthesizing filter 400 comprises first to third two-band synthesis portions 401 to 403. The first to third two-band synthesis portions 401 to 403 respectively comprise LPFs 411 to 413, HPFs 421 to 423, up-samplers 431 to 433 and 441 to 443 for inserting zero into a signal at a ratio of 2:1, and adders 451 to 453.

The first two-band synthesis portion 401 receives the LL3 signal and the LH3 signal, transforms the signals, respectively, into signals of sizes which are twice their original sizes using the up-samplers 431 to 441, filters the two signals obtained by the transform with respect to their vertical components using the LPF 411 and the HPF 421, and then adds the signals to output the result of the addition. On the other hand, the second two-band synthesis portion 402 receives the HL3 signal and the HH3 signal, transforms the signals, respectively, into signals of sizes which are twice their original sizes using the up-samplers 432 to 442, filters the two signals obtained by the transform with respect to their vertical components using the LPF 412 and the HPF 422, and then adds the signals to output the result of the addition. The third two-band synthesis portion 403 receives outputs of the adders 451 and 452, transforms the outputs, respectively, into signals of sizes which are twice their original sizes using the up-samplers 433 to 443, filters the two signals obtained by the transform with respect to their horizontal components using the LPF 413 and the HPF 423, and then adds the signals to output the result of the addition.

Consequently, the LL2 signal, low in both its horizontal and vertical components, which is a second hierarchical signal, is outputted from the first band synthesizing filter 400. The second and third band synthesizing filters 500 and 600 also respectively perform the same processing, as described above, with respect to signals inputted thereto.

The band synthesis portion 16 synthesizes the ten frequency band signals, i.e., the LL3 signal, the LHi signals, the HLi signals, and the HHi signals in the above-mentioned procedure, as described above, and reconstructs an image signal 72 which has been subjected to embedding processing, to output the reconstructed image signal 72.

As described in the foregoing, in the digital information embedding apparatus 1A according to the first embodiment of the present invention, the bit position of information composing digital information to be embedded is used as a key, to generate a secondary key using a predetermined function, and the energies of wavelet coefficients in a frequency band, other than an embedding object region, corresponding to the same space representation region as the position of a block selected on the basis of the secondary key are judged, to embed the digital information. Consequently, the quality of an image is hardly degraded at the time of decoding, and a third person not knowing a method of generating the secondary key has little clue as to the embedded digital information.

Discrete wavelet transform performed by the digital information embedding apparatus 1A according to the first embodiment is not limited to three hierarchies. For example, it can be performed even many times until an LL signal reaches a 1×1 element. A method of calculating energies in the energy analysis portion 14 in the first embodiment is not limited to a method of finding the sum of the absolute amplitude values of wavelet coefficients, a method of finding the sum of the squares of wavelet coefficients, and a method of finding the dispersion of wavelet coefficients. For example, the calculation may be performed using other methods. Although in the first embodiment, an example using a flag as key information representing whether or not a secondary key is used is taken as an example, it goes without saying that information in another form can be used, provided that it can represent the presence or absence of the use of the secondary key.

Figure 8:
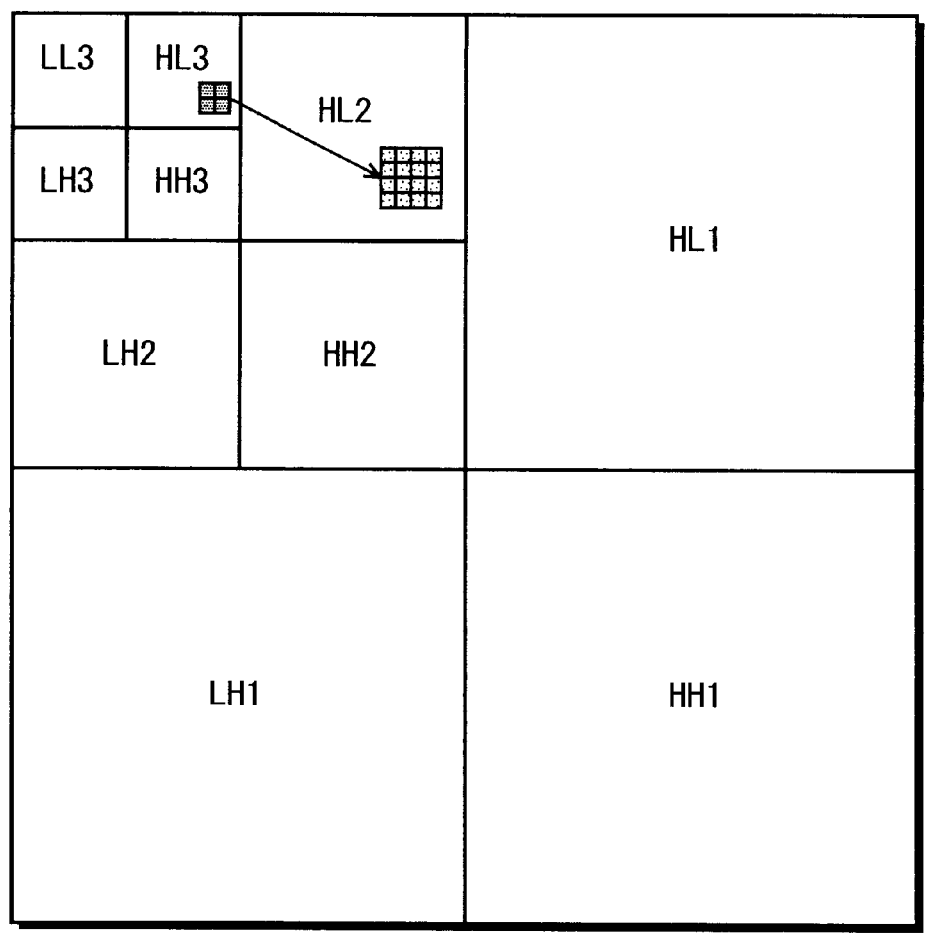
FIGS. 8 to 10 are diagrams each showing an example of the positional relationship between an embedding object region in a case where an MRR component is taken as an embedding object region and a frequency region including wavelet coefficients used for energy calculation.
Figure 9:
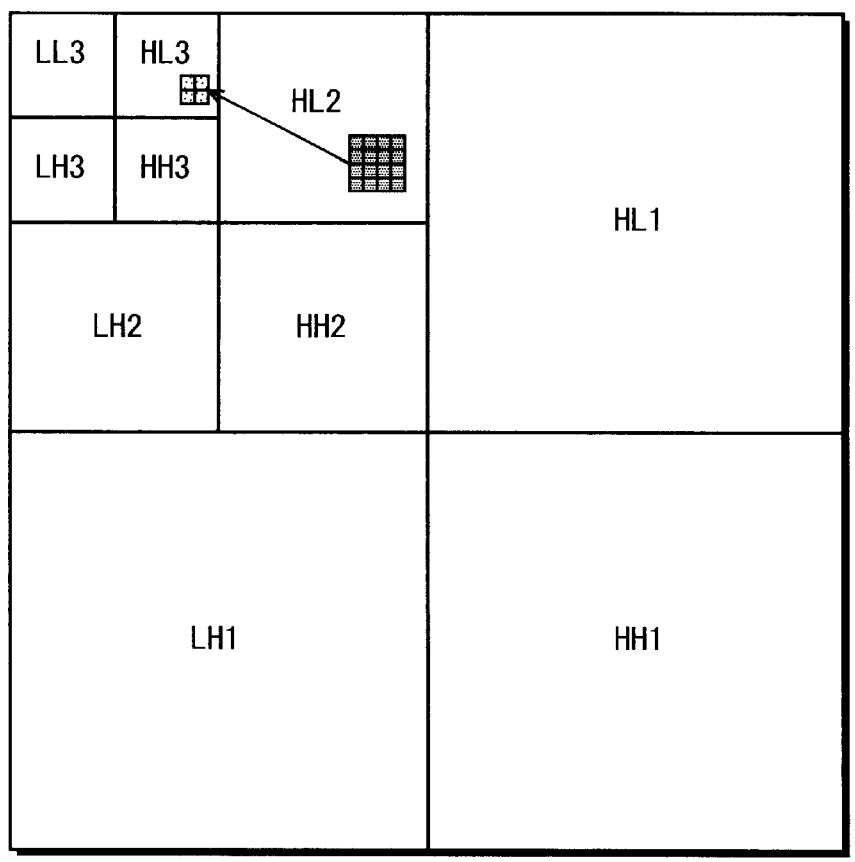
Figure 10:
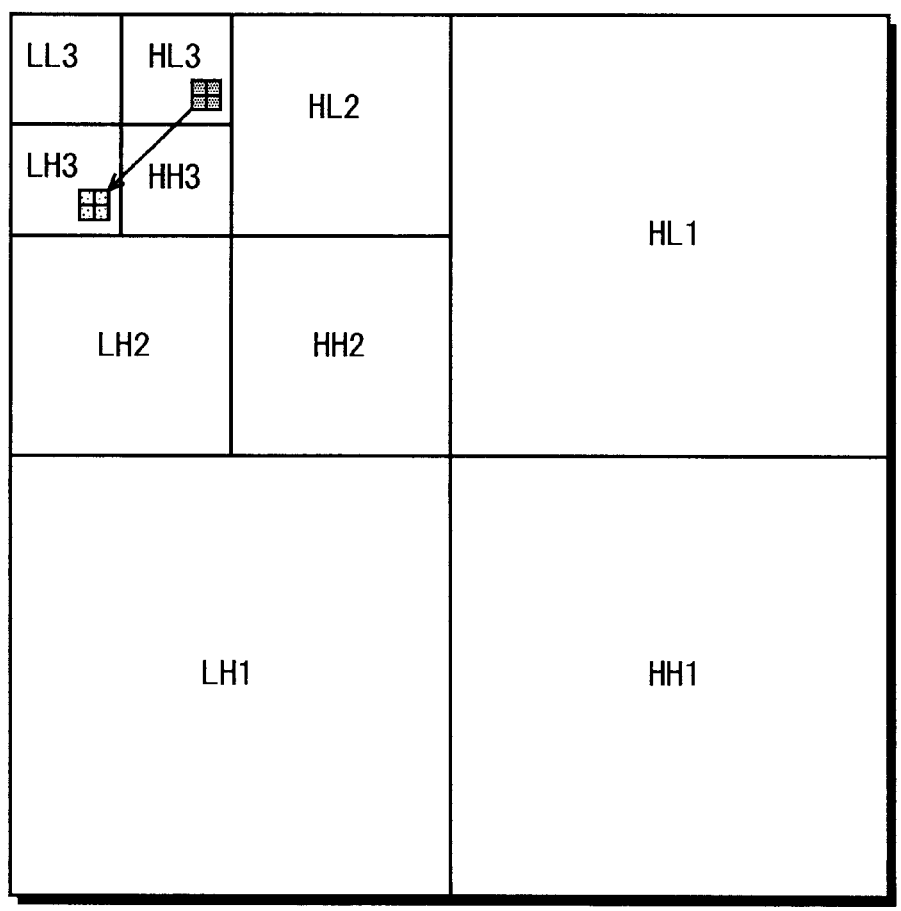

In the above-mentioned first embodiment, description was made of a case where an embedding object region is an LL3 signal (MRA component) which is the lowest frequency band, and frequency bands other than the embedding object region are MRR components other than the MRA component as an example. However, the digital information embedding processing according to the present invention can be performed in the same procedure as described above even if the embedding object region is an MRR component. In this case, it is possible to use, as wavelet coefficients in the frequency band, other than the embedding object region, corresponding to the same space representation region, wavelet coefficients in the frequency band which is the same in the direction of band division with respect to both its horizontal and vertical components as that in the embedding object region. For example, the wavelet coefficients in the HL2 signals are used by taking the embedding object region as the HL3 signal (FIG. 8), while the wavelet coefficients in the HL3 signal are used by taking the embedding object region as the HL2 signal (FIG. 9). It is possible to use, as the above-mentioned wavelet coefficients, wavelet coefficients in the frequency band which differ in the direction of band division with respect to both its horizontal and vertical components from that in the embedding object region. For example, the wavelet coefficients in the LH3 signal can be used by taking the embedding object region as the HL3 signal (FIG. 10).

(Second Embodiment)

FIG. 11 is a block diagram showing the configuration of a digital information extracting apparatus according to a second embodiment of the present invention. A digital information extracting apparatus 1B according to the second embodiment is an apparatus for extracting digital information embedded by the digital information embedding apparatus 1A according to the above-mentioned first embodiment. In FIG. 11, the digital information extracting apparatus 1B according to the second embodiment comprises a band division portion 11, a block division portion 12, a key generation portion 13, an energy analysis portion 14, and an information detection portion 21.

The band division portion 11, the block division portion 12, the key generation portion 13, and the energy analysis portion 14 in the digital information extracting apparatus 1B according to the second embodiment respectively have the same configurations as the band division portion 11, the block division portion 12, the key generation portion 13, and the energy analysis portion 14 in the digital information embedding apparatus 1A according to the first embodiment, and are assigned the same reference numerals and hence, the description thereof is partially omitted.

The band division portion 11 receives an image signal 81. The image signal 81 is the image signal 72 outputted by the band synthesis portion 16 in the digital information embedding apparatus 1A according to the first embodiment. The band division portion 11 subjects the received image signal 81 to discrete wavelet transform, to divide the image signal 81 into signals in ten frequency bands, i.e., an LL3 signal, LHi signals, HLi signals, and HHi signals, to calculate wavelet coefficients in each of the signals. The information detection portion 21 detects the embedded digital information from the wavelet coefficients in a specified block in the LL3 signal if energies calculated by the energy analysis portion 14 are not less than a predetermined set value T.

Referring to FIG. 12, a digital information extracting method which is carried out by the digital information extracting apparatus according to the second embodiment is described stepwise. Description is now made in correspondence with a case where embedding processing is performed by taking an embedding object region as an LL3 signal (MRA component) and taking frequency bands other than the embedding object region as MRR components in the digital information embedding apparatus. FIG. 12 is a flowchart showing processing performed by the block division portion 12, the key generation portion 13, the energy analysis portion 14, and the information detection portion 21 shown in FIG. 11.

Referring to FIG. 12, the block division portion 12 first divides the LL3 signal, which is the embedding object region, outputted by the band division portion 11 into first to N-th blocks in a predetermined block size (step S1201). The key generation portion 13 then takes the value of a counter y representing the bit position of information composing digital information to be embedded as "1" (step S1202). Further, the key generation portion 13 initializes a table storing key information indicating whether or not a secondary key is used for embedding by "flag 0" (step S1203). The key generation portion 13 then calculates an initial value $r_0$ based on the value of y using a predetermined function G (step S1204). The key generation portion 13 takes a counter j for designating a secondary key as "1" (step S1205). The key generation portion 13 generates a secondary key $r_j$ from a key $r_{j-1}$ using a predetermined function F (step S1206).

Thereafter, the key generation portion 13 refers to the table, to judge whether or not the secondary key $r_j$ generated at the foregoing step S1206 has already been used for embedding processing (step S1207). At the step S1207, when the secondary key $r_j$ is judged to have been used, the key generation portion 13 increments the value of the counter j by "1", and the processing at the step S1206 and the subsequent steps is repeated in order to generate another secondary key (step S208). On the other hand, at the foregoing step S1207, when the secondary key $r_j$ is judged not to have been used yet, the key generation portion 13 records information indicating that the secondary key $r_j$ is used for digital information embedding processing by storing "flag 1" in a corresponding portion of the table (setting a flag) (step S1209).

The energy analysis portion 14 then selects the block, corresponding to the value of the secondary key $r_j$, out of the first to N-th blocks in the LL3 signal (MRA component) obtained by the division at the foregoing step S1201 (step S1210). After the selection, the energy analysis portion 14 extracts wavelet coefficients in the frequency band, other than the embedding object region, i.e., the MRR component, corresponding to the same space representation region as the position of the selected block (step S1211). The energy analysis portion 14 extracts wavelet coefficients in only hierarchically-deeper second and third hierarchical signals, as described in the first embodiment. The energy analysis portion 14 calculates the energies of the wavelet coefficients in the MRR component which have been extracted at the foregoing step S1211 (step S1212).

The information detection portion 21 then judges whether or not the energies calculated at the foregoing step S1212 are not less than a predetermined set value T (step S1213). When the energies are judged as being not less than the set value T at the step S1213, the information detection portion 21 detects information (logical value) corresponding to the y-th bit of the embedded digital information from the wavelet coefficients in the selected block in the LL3 signal (step S1214). Contrary to this, when the energies are judged as being less than the set value T at the foregoing step S1213, it is judged that no digital information is embedded in the block, and the value of the counter j is incremented by "1", and the processing at the step S1206 and the subsequent steps is repeated in order to generate another secondary key (step S1208).

After the extraction processing of the information corresponding to the y-th bit is terminated, the information detection portion 21 judges whether or not every digital information has been extracted, that is, extraction processing of the information corresponding to the first to Y-th bits has been performed (step S1215). When the extraction processing of the information corresponding to the first to Y-th bits has not been performed in the judgment at the step S1215, the information detection portion 21 increments the value of the counter y by "1" in order to proceed to extraction processing of the information corresponding to the subsequent (y+1)-th bit (step S1216). Thereafter, the program is returned to the foregoing step S1204, to repeatedly perform the same processing. On the other hand, when the information corresponding to the first to Y-th bits have been extracted in the judgment at the foregoing step S1215, the extraction processing is terminated.

The information detection portion 21 thus performs the above-mentioned digital information extraction processing with respect to all the bits composing the digital information, respectively extracts information (logical values) embedded in the image signal 81, and reproduces the information as a bit stream 82 of the digital information.

As described in the foregoing, the digital information extracting apparatus 1B according to the second embodiment of the present invention uses the bit position of information composing digital information to be embedded as a key, to generate a secondary key using a predetermined function, and judges the energies of wavelet coefficients in a frequency band, other than an embedding object region, corresponding to the same space representation region as the position of a block selected on the basis of the secondary key, to extract the digital information. Consequently, the digital information can be accurately extracted without being affected by an unauthorized user's attempts that much. Moreover, a third person not knowing a method of generating the secondary key has little clue as to the embedded digital information.

(Third Embodiment)

Figure 13:
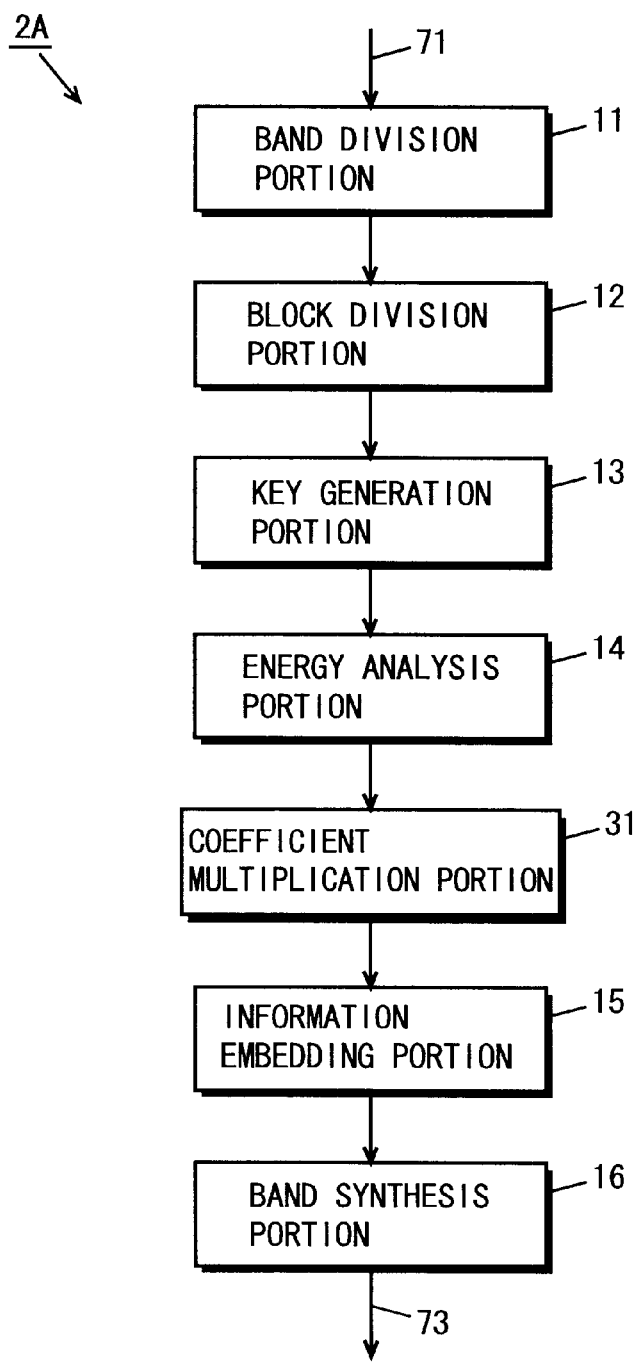
FIG. 13 is a block diagram showing the configuration of a digital information embedding apparatus 2A according to a third embodiment of the present invention.

FIG. 13 is a block diagram showing the configuration of a digital information embedding apparatus according to a third embodiment of the present invention. In FIG. 13, a digital information embedding apparatus 2A according to the third embodiment comprises a band division portion 11, a block division portion 12, a key generation portion 13, an energy analysis portion 14, a coefficient multiplication portion 31, an information embedding portion 15, and a band synthesis portion 16.

The band division portion 11, the block division portion 12, the key generation portion 13, the energy analysis portion 14, the information embedding portion 15, and the band synthesis portion 16 in the digital information embedding apparatus 2A according to the third embodiment respectively have the same configurations as the band division portion 11, the block division portion 12, the key generation portion 13, the energy analysis portion 14, the information embedding portion 15, and the band synthesis portion 16 in the digital information embedding apparatus 1A according to the first embodiment, and are assigned the same reference numerals and hence, the description thereof is partially omitted.

The coefficient multiplication portion 31 multiplies wavelet coefficients used for energy calculation by a predetermined value U (U is a real number of not less than one) if energies calculated by the energy analysis portion 14 are in a range of not less than a predetermined set value T but less than a predetermined upper limit value T1 (T1≧T). On the other hand, the coefficient multiplication portion 31 multiplies the wavelet coefficients used for energy calculation by a predetermined value L (L is a real number of not more than one) if the energies calculated by the energy analysis portion 14 are in a range of less than the predetermined set value T and not less than a predetermined lower limit value T2 (T2≦T). The information embedding portion 15 embeds one of bits composing digital information in wavelet coefficients in a specified block in an embedding object region if the energies are not less than the predetermined set value T. The band synthesis portion 16 synthesizes a signal in the embedding object region which has been subjected to the embedding processing and signals in a plurality of frequency bands other than the embedding object region, to reconstruct an image signal 73.

Figure 14:
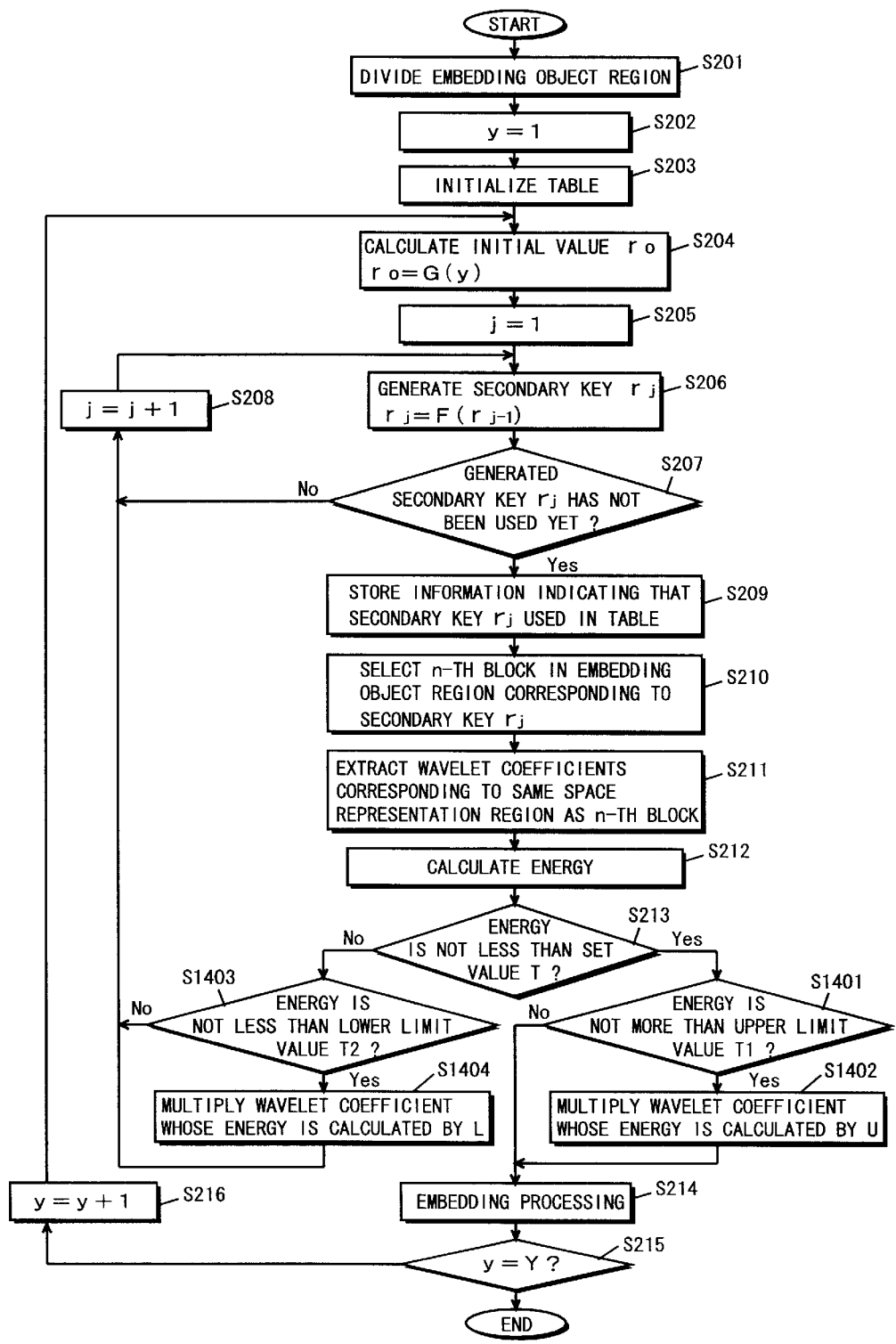
FIG. 14 is a flowchart showing processing performed by a block division portion 12, a key generation portion 13, an energy analysis portion 14, a coefficient multiplication portion 31, and an information embedding portion 15 shown in FIG. 13.

Referring to FIGS. 14 and 2, a digital information embedding method which is carried out by the digital information embedding apparatus 2A according to the third embodiment is described stepwise. FIG. 14 is a flowchart showing processing performed by the block division portion 12, the key generation portion 13, the energy analysis portion 14, the coefficient multiplication portion 31, and the information embedding portion 15 shown in FIG. 13. In FIG. 14, the steps at which the same processing as that shown in FIG. 2 is performed are assigned the same step numbers as those shown in FIG. 2 and hence, the description thereof is not repeated.

Referring to FIG. 14, the energy analysis portion 14 selects, with respect to a secondary key $r_j$ generated by the key generation portion 13, a block in a corresponding embedding object region, that is, an LL3 signal (step S210). Wavelet coefficients in each of MRR components which are a plurality of frequency bands, other than the embedding object region, corresponding to the same space representation region as the position of the block are extracted (step S211). The energy analysis portion 14 calculates the energies of the extracted wavelet coefficients in the MRR component (step S212).

The coefficient multiplication portion 31 then judges whether or not the energies calculated at the foregoing step S212 are not less than a predetermined set value T (step S213). When the energies are judged as being not less than the set value T at the step S213, the coefficient multiplication portion 31 further judges whether or not the energies calculated at the foregoing step S212 are not more than a predetermined upper limit value T1 (step S1401). When the energies are not more than the upper limit value T1 in the judgment at the step S1401, the coefficient multiplication portion 31 multiplies all the wavelet coefficients in the MRR component which are extracted at the foregoing step S211 by U (step S1402). Thereafter, the information embedding portion 15 embeds information (logical value), corresponding to the y-th bit of the digital information, in the wavelet coefficients in the selected block in the LL3 signal (step S214). Contrary to this, when the energies are judged as being more than the upper limit value T1 at the foregoing step S1401, the information embedding portion 15 embeds information (logical value), corresponding to the y-th bit of the digital information, in the wavelet coefficients in the selected block in the LL3 signal without multiplying the wavelet coefficients by U in the coefficient multiplication portion 31 (step S214).

On the other hand, when the energies are judged as being less than the set value T at the foregoing step S213, the coefficient multiplication portion 31 further judges whether or not the energies calculated at the foregoing step S212 are not less than a predetermined lower limit value T2 (step S1403). When the energies are judged as being not less than the lower limit value T2 at the step S1403, the coefficient multiplication portion 31 multiplies all the wavelet coefficients in the MRR component which are extracted at the foregoing step S211 by L (step S1404). Thereafter, the value of a counter j is incremented by "1", and the processing at the step S206 and the subsequent steps is repeated in order to generate another secondary key (step S208). Contrary to this, when the energies are judged as being less than the lower limit value T2 at the foregoing step S1403, the value of the counter j is incremented by "1", and the processing at the step S206 and the subsequent steps is repeated in order to generate another secondary key without multiplying the wavelet coefficients by L in the coefficient multiplication portion 31 (step S208).

An example in which wavelet coefficients in each of MRR components corresponding to the same space representation region as the block position shown in FIG. 3 is multiplied by U is described. In this example, the energies are calculated by the sum of the absolute amplitude values of the wavelet coefficients. The set value T is taken as 130, the upper limit value T1 is taken as 140, and U is taken as 1.1.

The energies of the wavelet coefficients in the MRR component which are extracted at the step S211 are 133 when the wavelet coefficients in the MRR component are as follows:

HL3={10, −5, 1, −2}

LH3={0, 2, −3, 7}

HL2={1, 3, −2, 6, 9, 12, −20, −16, 4, 8, 1, −2, −3, 1, 0, 1}

LH2={2, 1, 0, −1, −2, 0, 1, 1, 0, −1, −3, 0, 0, 1, −1, 0}

Consequently, the energies are not less than the set value T nor more than the upper limit value T1. Accordingly, the wavelet coefficients in the MRR component in this example are respectively multiplied by U, and are replaced with the following wavelet coefficients (at this time, the energies of the wavelet coefficients in the MRR component are 146.3):

HL3={11, −5.5, 1.1, −2.2}

LH3={0, 2.2, −3.3, 7.7}

HL2={1.1, 3.3, −2.2, 6.6, 9.9, 13.2, −22, −17.6, 4.4, 8.8, 1.1, −2.2, −3.3, 1.1, 0, 1.1}

LH2={2.2, 1.1, 0, −1.1, −2.2, 0, 1.1, 1.1, 0, −1.1, −3.3, 0, 0, 1.1, −1.1, 0}

As described in the foregoing, in the digital information embedding apparatus 2A according to the third embodiment of the present invention, the bit position of information composing digital information to be embedded is used as a key, to generate a secondary key using a predetermined function, and the energies of wavelet coefficients in each of frequency bands, other than am embedding object region, corresponding to the same space representation region as the position of a block selected on the basis of the secondary key are judged, to embed the digital information. Consequently, the quality of an image is hardly degraded at the time of decoding, and a third person not knowing a method of generating the secondary key has little clue as to the embedded digital information.

Furthermore, in the digital information embedding apparatus according to the third embodiment of the present invention, only when the energies of wavelet coefficients in each of a plurality of frequency bands, other than an embedding object region, corresponding to the same space representation region as the position of a selected block, that is, MRR components are close to a set value T, the wavelet coefficients are multiplied by a predetermined value (U or L). In digital information extraction processing, therefore, it is possible to prevent erroneous detection and incomplete detection in a case where the energies are not less than the set value T more satisfactorily, as compared with the digital information embedding apparatus 1A according to the first embodiment, against a third person's attempts for unauthorized utilization (for example, image compression). Accordingly, embedded digital information can be accurately extracted.

A digital image signal used in the digital information embedding apparatus and extracting apparatus according to the first to third embodiments is not limited to a still image signal. For example, it may be a moving image signal. In the case of the moving image signal, the same effect can be produced by performing embedding processing and extraction processing of digital information for each of frames composing a moving image (for example, every 30 frames per second). In the digital information embedding apparatus and extracting apparatus according to the first to third embodiments, energies are analyzed using the energy analysis portion 14, and digital information is embedded in only a block including wavelet coefficients whose energies are not less than a set value T. However, it goes without saying that the digital information may be embedded without performing the analysis processing.

(Fourth Embodiment)

In the first to third embodiments, description was made of an apparatus for and a method of embedding and extracting digital information in an MRA component corresponding to a detailed part of an image signal or MRR components in lower frequency bands. Contrary to this, in the following embodiment, description is made of an apparatus for and a method of embedding and extracting digital information using the average value of a plurality of frequency coefficients out of frequency coefficients in each of low frequency components excluding a DC component.

Figure 15:
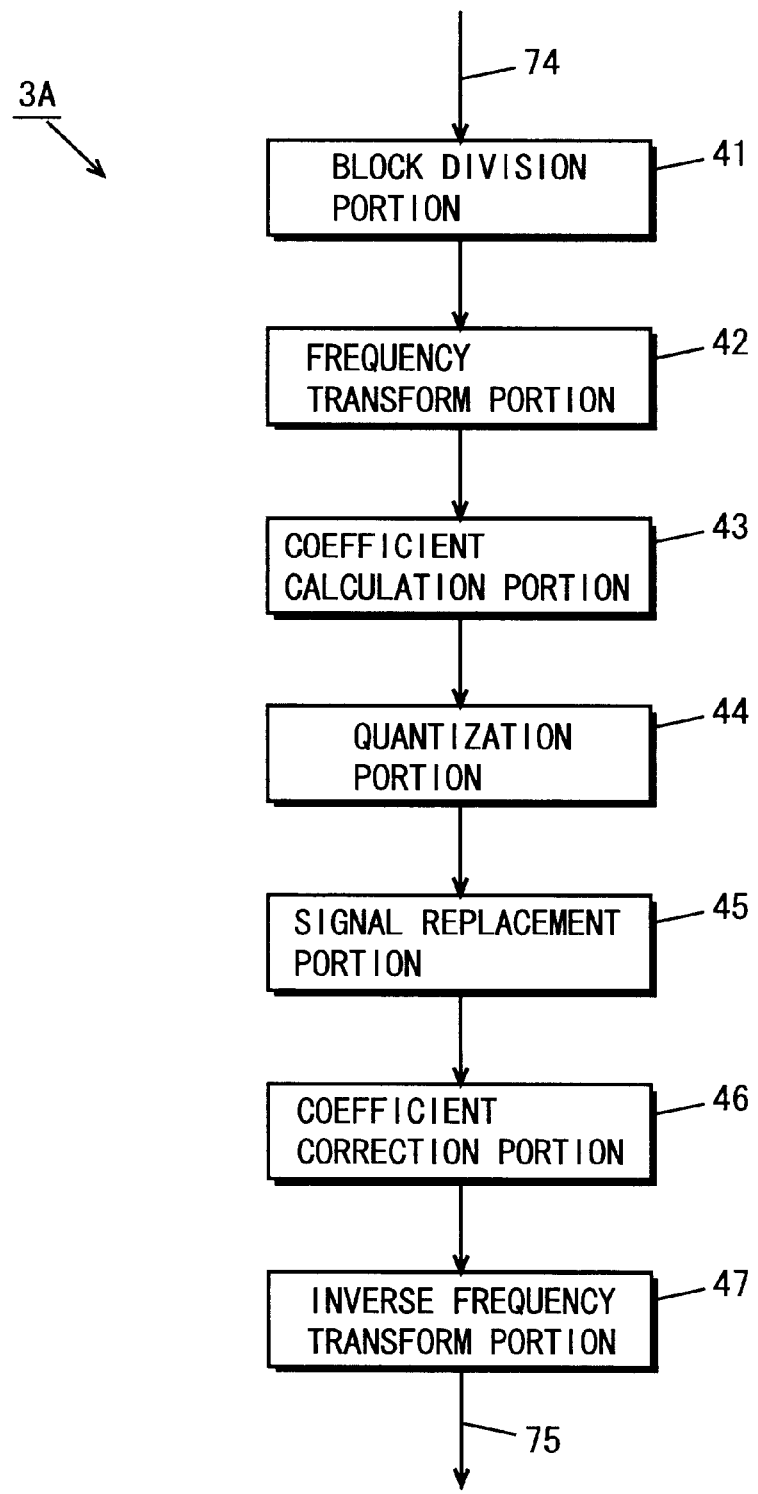
FIG. 15 is a block diagram showing the configuration of a digital information embedding apparatus 3A according to a fourth embodiment of the present invention.

FIG. 15 is a block diagram showing the configuration of a digital information embedding apparatus according to a fourth embodiment of the present invention. In FIG. 15, a digital information embedding apparatus 3A according to the fourth embodiment comprises a block division portion 41, a frequency transform portion 42, a coefficient calculation portion 43, a quantization portion 44, a signal replacement portion 45, a coefficient correction portion 46, and an inverse frequency transform portion 47.

The block division portion 41 receives a digitized image signal 74, and divides the image signal 74 into a plurality of blocks in a predetermined block size. The frequency transform portion 42 performs frequency transform for each of the blocks obtained by the division in the block division portion 41, to calculate frequency coefficients C. The coefficient calculation portion 43 selects a plurality of particular frequency coefficients C out of the frequency coefficients C obtained by the frequency transform portion 42, to calculate the average value of the absolute values (hereinafter referred to as absolute average value) M and the energies S of the selected frequency coefficients C. The quantization portion 44 subjects the found absolute average value to linear quantization to calculate a quantization value q using a predetermined quantization step-size Q only when the energies S found by the coefficient calculation portion 43 are not less than a predetermined threshold value K. The signal replacement portion 45 replaces the quantization value q with a value (q−1) or a value (q+1) to output the value or outputs the value q as it is on the basis of the quantization value q and the value of digital information to be embedded. The coefficient correction portion 46 subjects the quantization value (q−1) or (q+1) or the quantization value q which is outputted by the signal replacement portion 45 to inverse linear quantization to find an average value M' using the quantization step-size Q, and calculates a difference DM (=M'−M) between the average value M' and the absolute average value M, to correct all of the selected frequency coefficients C. The inverse frequency transform portion 47 respectively subjects all the blocks obtained by the division in the block division portion 41 to inverse frequency transform, to reconstruct an image signal 75.

Figure 17:
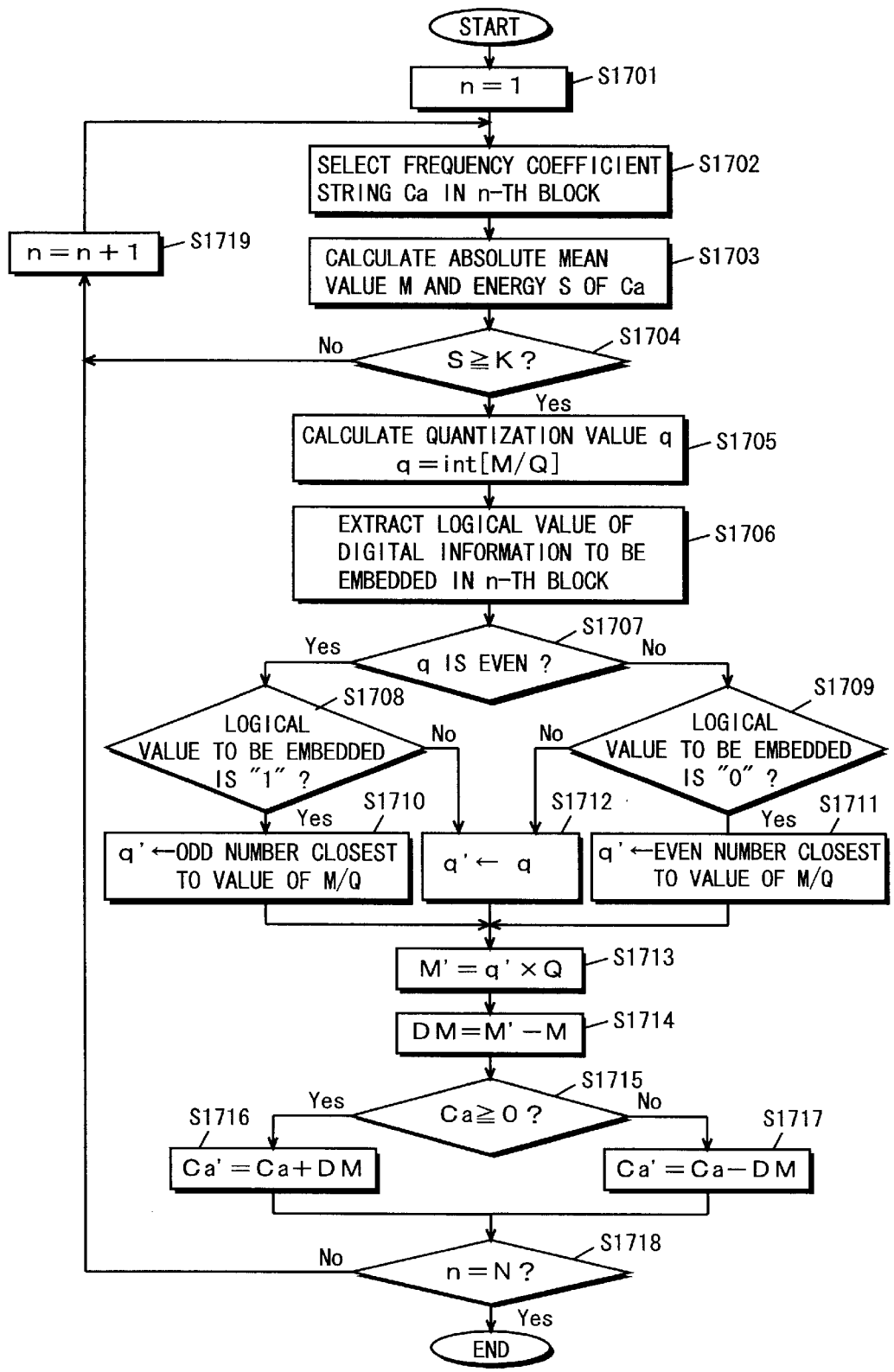
FIG. 17 is a flowchart showing processing performed by a coefficient calculation portion 43, a quantization portion 44, a signal replacement portion 45, and a coefficient correction portion 46 shown in FIG. 15.
Figure 18:
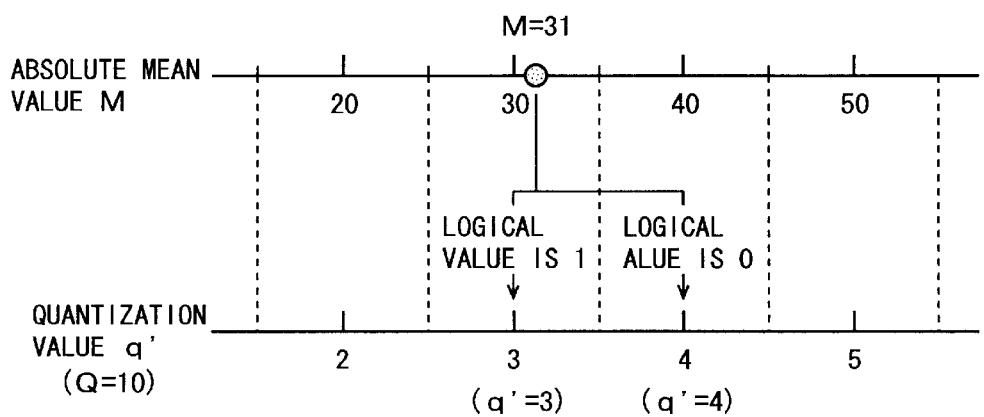
FIG. 18 is a diagram showing an example of processing performed by the signal replacement portion 45 shown in FIG. 15.

Referring now to FIGS. 16 to 18, a digital information embedding method which is carried out by the digital information embedding apparatus 3A according to the fourth embodiment is described stepwise. FIG. 16 is a diagram showing an example of processing performed by the block division portion 41 and the frequency transform portion 42. FIG. 17 is a flowchart showing processing performed by the coefficient calculation portion 43, the quantization portion 44, the signal replacement portion 45, and the coefficient correction portion 46 shown in FIG. 15. FIG. 18 is a diagram showing an example of processing performed by the signal replacement portion 45 shown in FIG. 15. In the following description, digital information to be embedded in a digital image shall be a bit stream obtained by binary-coding the name of a copyright holder, the date of creation, and so forth.

Referring to FIG. 16, the block division portion 41 first receives the digital image signal 74, and divides the digital image signal 74 into the first to N-th (N is an integer of not less than two; the same is true for the following) blocks in a predetermined block size. The number N of blocks obtained by the division may be not less than the number of logical values of the digital information to be embedded. The frequency transform portion 42 then frequency-transforms each of signals in the first to N-th blocks obtained by the division in the block division portion 41, to calculate frequency coefficients C of the same block size.

FIG. 16 illustrates a case where in the block division portion 41 and the frequency transform portion 42, the image signal 74 is divided into a plurality of blocks each composed of pixels of a 8×8 size (FIG. 16(a)), and each of the blocks is subjected to orthogonal transform by discrete cosine transform (DCT) (from FIG. 16(b) to FIG. 16(c)). A frequency coefficient C at the upper left out of frequency coefficients C shown in FIG. 16(c) is referred to as a DC component (DC), and the other frequency coefficients C are referred to as AC components. The block size may be an arbitrary size other than the 8×8 size illustrated in FIG. 16.

Referring to FIG. 17, the coefficient calculation portion 43 first takes the value of a counter n (n=1 to N; the same is true for the following) representing the position of a block obtained by the division in the block division portion 41 as "1" (step S1701). The coefficient calculation portion 43 then selects particular frequency coefficients $C_1$ to $C_a$ (a is an integer of not less than one) out of a plurality of frequency coefficients C in the n-th block found in the frequency transform portion 42 (step S1702). A group of the selected frequency coefficients $C_1$ to $C_a$ is hereinafter referred to as a frequency coefficient string Ca. In the present invention, it is most preferable to select the frequency coefficient string Ca in low frequency components closer to a DC component. For example, in an example shown in FIG. 16(c), a frequency coefficient string C9 composed of nine frequency coefficients $C_1$ to $C_9$ in the vicinity of the DC component (portion enclosed by a solid line in the drawing) is selected.

Furthermore, the coefficient calculation portion 43 calculates the absolute average value M and the energy S of the selected frequency coefficient string Ca (step S1703). Used for the calculation of the energy S is a method of finding the sum or the average of the absolute amplitude values of the frequency coefficients $C_1$ to $C_a$ composing the frequency coefficient string Ca, a method of finding the sum or the average of the squares thereof, or a method of finding the dispersion, for example.

The quantization portion 44 then judges whether or not the energy S calculated at the foregoing step S1703 is not less than a predetermined threshold value K (step S1704). The threshold value K is a value for judging whether or not the quality of an image is degraded by embedding digital information. Consequently, the threshold value K is not uniquely determined but can be suitably and arbitrarily set in correspondence with the purpose of use of the apparatus and the level or the like of an image signal handled by the apparatus. By the processing, embedding processing can be performed only for the block which does not greatly degrade the quality of the image.

When the energy S is judged as being not less than the threshold value K at the foregoing step S1704, the absolute average value M is subjected to linear quantization to calculate a quantization value q using a predetermined quantization step-size Q (Q is an integer of not less than one) (step S1705). "Linear quantization" means rounding a certain numerical value to a whole number by rounding up or down figures after its decimal point in accordance with a found-off rule (function int[X] shall represent linear quantization of X). The quantization step-size Q is the spacing between a transform value in a case where digital information to be embedded takes a logical value "1" and a transform value in a case where it takes a logical value "0", or the amount of replacement. When the quantization step-size Q is decreased, therefore, the quality of the image is hardly degraded, while the attempt resistance of the digital information is decreased. When the quantization step-size Q is increased, the attempt resistance of the digital information is increased, while the quality of the image is significantly degraded because the amount of replacement is increased. Consequently, the quantization step-size Q is not uniquely determined but can be arbitrarily set by the purpose of use and an object image signal. In the description of the fourth embodiment of the present invention, the quantization step-size Q is taken as 10.

For example, the absolute average value M of the frequency coefficient string C9 selected at the foregoing step S1703 is 31 (=279/9) when the frequency coefficient string C9 is as follows:

$$C9=\{80, -60, 45, 20, -25, 20, 10, -10, 9\}$$

Consequently, the quantization value q is as follows, as described above:

$$q=\text{int}[M/Q]=\text{int}[31/10]=3$$

On the other hand, when the energy S is judged as being less than the threshold value K at the foregoing step S1704, it is judged that digital information should not be embedded in the n-th block. In order to specify the subsequent block, the value of the counter n is incremented by "1" (step S1719), the processing at the step S1702 and the subsequent steps is repeated.

The signal replacement portion 45 then extracts a logical value ("1" or "0"), of digital information, to be embedded in the n-th block (step S1706). Thereafter, the signal replacement portion 45 judges whether or not the quantization value q is even or odd (step S1707).

When the quantization value q is even in the judgment at the foregoing step S1707, the signal replacement portion 45 further judges whether or not the logical value of the digital information which has been extracted at the foregoing step S1706 is "1" (step S1708). When the logical value to be embedded is judged as being "1" at the step S1708, the signal replacement portion 45 takes an odd number (either q+1 or q−1) closest to the value of M/Q as a quantization value q' (i.e., the quantization value q is replaced with q') (step S1710). Contrary to this, when the logical value to be embedded is judged as being "0" at the foregoing step S1708, the signal replacement portion 45 takes the quantization value q as a quantization value q' as it is (step S1712).

On the other hand, when the quantization value q is not even (i.e., is odd) in the judgment at the foregoing step S1707, the signal replacement portion 45 further judges whether or not the logical value to be embedded is "0" (step S1709). When the logical value to be embedded is judged as being "0" at the step S1709, the signal replacement portion 45 takes an even number (q+1 or q−1) closest to the value of M/Q as a quantization value q' (step S1711). Contrary to this, when the logical value to be embedded is judged as being "1" at the foregoing step S1709, the signal replacement portion 45 takes the quantization value q as a quantization value q' as it is (step S1712).

For example, referring to FIG. 18, when the absolute average value M is 31, and the quantization step-size Q is 10, the quantization value q is an odd number "3", and M/Q is 3.1. By following the steps S1707 and S1712, therefore, when the logical value "1" of the digital information is embedded, the value of q=3 is taken as a quantization value q'=3 because the quantization value q is odd. Contrary to this, when the logical value "0" of the digital information is embedded, an even number closest to the value of M/Q=3.1, i.e., "4" is taken as a quantization value q' (=q+1).

The coefficient correction portion 46 then performs inverse linear quantization using the quantization value q' which is found at any of the foregoing steps S1710 to S1712 and the quantization step-size Q, to calculate an average value M' (=q'×Q) (step S1713). The coefficient correction portion 46 finds a difference DM (=M'−M) between the calculated average value M' and the absolute average value M found at the foregoing step S1703 (step S1714).

Furthermore, the coefficient correction portion 46 judges whether the sign of the frequency coefficient string Ca selected at the foregoing step S1702 is positive or negative (step S1715). The judgment of the sign of the frequency coefficient string Ca means the judgment of the respective signs of the frequency coefficients $C_1$ to $C_a$ composing the frequency coefficient string Ca. The coefficient correction portion 46 adds the difference DM to each of the frequency coefficients $C_1$ to $C_a$ when the sign of the frequency coefficient $C_x$ is positive (including zero) in the judgment at the foregoing step S1715 (step S1716), while subtracts the difference DM therefrom when the sign of the frequency coefficient $C_x$ is negative (step S1717), to find a frequency coefficient string Ca' after the correction.

For example, in a case where the logical value to be embedded is "0", q'=4, as described above, when the frequency coefficient string C9 selected at the foregoing step S1703 is as follows:

$$C9=\{80, -60, 45, 20, -25, 20, 10, -10, 9\}$$

Accordingly, an average value M' after the inverse linear quantization is as follows:

$$M'=q'\times Q=4\times 10=40$$

A difference between the average value M' and the absolute average value M is as follows:

$$DM=M'-M=40-31=+9$$

Consequently, a frequency coefficient string C9' after the correction is as follows by adding "9" to the frequency coefficient C whose value is positive, while subtracting "9" from the frequency coefficient C whose value is negative such that the absolute value thereof is larger by "9":

$$C9'=\{89, -69, 54, 29, -34, 29, 19, -19, 18\}$$

At the foregoing step S1717, when the value of the difference DM is negative, and the absolute value of the frequency coefficient $C_x$ is smaller than the absolute value of the difference DM, there occurs such a phenomenon that the absolute value of a frequency coefficient $C_x'$ after the correction is not smaller but larger than that before the correction. An example is a case where the difference DM is −9, and the frequency coefficient $C_x$ is 3. The frequency coefficient $C_x'$ after the correction is "−6". In the above-mentioned case, the coefficient correction portion 46 makes correction by taking the frequency coefficient $C_x'$ as zero in order to make the number of errors which occur as small as possible.

Even if the absolute average value M of the frequency coefficient string Ca is not less than a threshold value K, when the quantization value q' obtained by the replacement is equal to the value of K/Q, an average value M' found upon performing inverse linear quantization in the coefficient correction portion 46 is as follows;

$$M'=q'\times Q=(K/Q)\times Q=K$$

The average value M' is corrected such that the absolute average value of the frequency coefficient string Ca' after the correction becomes the threshold value K.

In the above-mentioned case, the coefficient correction portion 46 adds a predetermined set value to the value of the difference DM (=M'−M=K−M≦0), to change the value of the difference DM such that the absolute average value M is larger than the threshold value K.

The coefficient calculation portion 43, the quantization portion 44, the signal replacement portion 45, and the coefficient correction portion 46 judge whether or not the above-mentioned digital information embedding processing (the foregoing steps S1702 to S1717) has been performed with respect to all of the first to N-th blocks (step S1718). When the embedding processing of the digital information in the first to N-th blocks has not been performed in the judgment at the step S1718, the value of the counter n is incremented by "1" in order to proceed to embedding processing of the digital information in the subsequent (n+1)-th block (step S1719). Thereafter, the program is returned to the foregoing step S1702, to repeatedly perform the same processing. On the other hand, when the embedding processing of the digital information in the first to N-th blocks has been performed in the judgment at the foregoing step S1718, the embedding processing is terminated. When the digital information embedding processing is terminated, the inverse frequency transform portion 47 respectively subjects all the blocks to inverse frequency transform (IDCT from FIG. 16(c) to FIG. 16(b)), to reconstruct an image signal 75 in which the digital information has been embedded.

When the number of bits composing the digital information is smaller than the number of blocks obtained by the division, methods such as a method of embedding all bits composing the digital information, and then continuously embedding the bits, starting with the first bit, and a method of embedding a bit "0 (or 1)" in all the remaining blocks may be used. Alternatively, the same bit may be embedded in several blocks.

As described in the foregoing, according to the digital information embedding apparatus 3A according to the fourth embodiment of the present invention, the energy S of the frequency coefficient string Ca in the low frequency components in the vicinity of the DC component is judged, to embed the digital information. Consequently, the quality of an image is hardly degraded at the time of decoding, and the embedded digital information can be prevented from being lost against a third person's attempts for unauthorized utilization.

The frequency transform portion 42 in the digital information embedding apparatus 3A according to the fourth embodiment is not limited to the above-mentioned discrete cosine transform (DCT). Fourier transform or Hadamard transform, for example, may be performed. A method of selecting a particular frequency coefficient string Ca in the coefficient calculation portion 43 is not limited to the nine frequency coefficients $C_1$ to $C_a$ in the low frequency components closer to the DC component. For example, a plurality of (other than nine) frequency coefficients may be used. Alternatively, a frequency coefficient C in the same position may not be selected for each block. A method of calculating the energy S is not limited to a method of finding the sum or the average of the absolute amplitude values of the frequency coefficient string Ca, a method of finding the sum or the average of the squares thereof, and a method of finding the dispersion. The calculation may be performed using other methods. Further, the replacement processing of the quantization value Q in the signal replacement portion 45 may be performed in such a manner that the quantization value q is replaced with an odd quantization value closest to the value of M/Q when the logical value of the digital information to be embedded is "0", while being replaced with an even quantization value closest to the value of M/Q when the logical value is "1".

(Fifth Embodiment)

Figure 19:
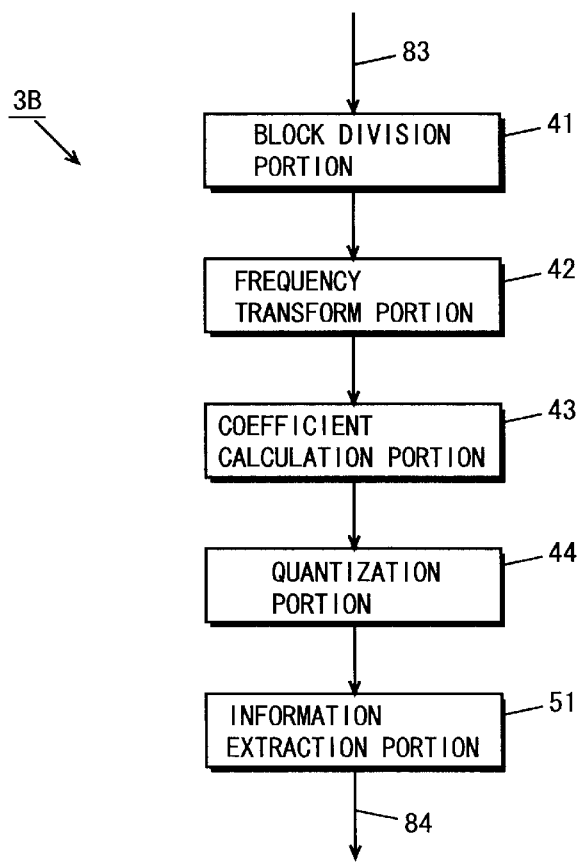
FIG. 19 is a block diagram showing the configuration of a digital information extracting apparatus 3B according to a fifth embodiment of the present invention.

FIG. 19 is a block diagram showing the configuration of a digital information extracting apparatus according to a fifth embodiment of the present invention. A digital information extracting apparatus 3B according to the fifth embodiment is the apparatus for extracting digital information embedded by the above-mentioned digital information embedding apparatus 3A according to the fourth embodiment. In FIG. 19, the digital information extracting apparatus 3B according to the fifth embodiment comprises a block division portion 41, a frequency transform portion 42, a coefficient calculation portion 43, a quantization portion 44, and an information extraction portion 51.

The block division portion 41, the frequency transform portion 42, the coefficient calculation portion 43, and the quantization portion 44 in the digital information extracting apparatus according to the fifth embodiment respectively have the same configurations as the block division portion 41, the frequency transform portion 42, the coefficient calculation portion 43, and the quantization portion 44 in the digital information embedding apparatus 3A according to the fourth embodiment, and are assigned the same reference numerals and hence, the description thereof is partially omitted.

The block division portion 41 receives an image signal 83. The image signal 83 includes a threshold value K used in the quantization portion 44 and a quantization step-size Q used for linear quantization in addition to an image signal 75 outputted by the inverse frequency transform portion 47 in the digital information embedding apparatus 3A according to the fourth embodiment. The block division portion 41 divides the received image signal 83 into a plurality of blocks in a predetermined block size. The frequency transform portion 42 performs frequency transform for each of the blocks obtained by the division, to calculate frequency coefficients C. The coefficient calculation portion 43 selects a plurality of particular frequency coefficients C out of the frequency coefficients obtained in the frequency transform portion 42, to calculate the absolute average value M and the energies S of the selected frequency coefficients C. The quantization portion 44 subjects the found absolute average value M to linear quantization to calculate a quantization value q using a predetermined quantization step-size Q only when the energies S found by the coefficient calculation portion 43 are not less than a predetermined threshold value K. The information extraction portion 51 judges whether each of the quantization values q which has been calculated in the quantization portion 44 is even or odd, to judge the logical value of embedded digital information on the basis of the judgment.

Figure 20:
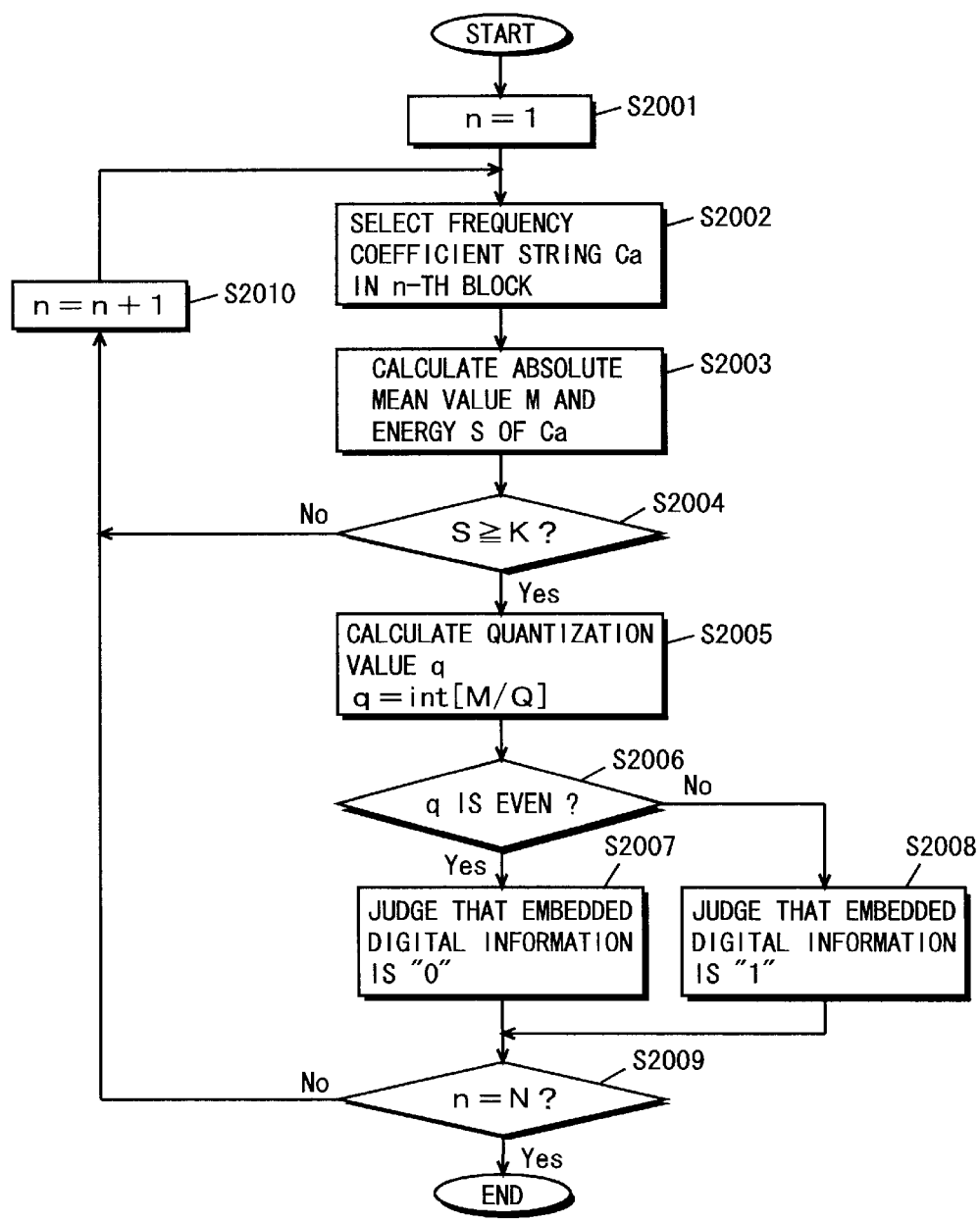
FIG. 20 is a flowchart showing processing performed by a coefficient calculation portion 43, a quantization portion 44, and an information extraction portion 51 shown in FIG. 19.

Referring now to FIG. 20, a digital information extracting method which is carried out by the digital information extracting apparatus 3B according to the fifth embodiment is described stepwise. FIG. 20 is a flowchart showing processing performed by the coefficient calculation portion 43, the quantization portion 44, and the information extraction portion 51 shown in FIG. 19.

The coefficient calculation portion 43 first takes the value of a counter n representing the position of a block obtained by the division in the block division portion 41 as "1" (step S2001). The coefficient calculation portion 43 then selects particular frequency coefficients $C_1$ to $C_a$, that is, a frequency coefficient string Ca out of frequency coefficients C in the n-th block found in the frequency transform portion 42 (step S2002). Information representing the frequency coefficient string Ca, together with the image signal 83, may be fed from the digital information embedding apparatus 3A. Alternatively, the digital information extracting apparatus 3B may previously fixedly have the information. Further, the coefficient calculation portion 43 calculates the absolute average value M and the energy S of the selected frequency coefficient string Ca (step S2003).

The quantization portion 44 then judges whether or not the energy S which has been calculated at the foregoing step S2003 is not less than a given threshold value K (step S2004). When the energy S is judged as being not less than the threshold value K at the foregoing step S2004, the absolute average value M is subjected to linear quantization to calculate a quantization value q using a given quantization step-size Q (step S2005). Contrary to this, when the energy S is judged as being less than the threshold value K at the step S2004, it is judged that no digital information is embedded in the n-th block. In order to specify the subsequent block, the value of the counter n is incremented by "1" (step S2010), the processing at the step S2002 and the subsequent steps is repeated.

The information extraction portion 51 then judges whether or not the quantization value q which has been calculated at the foregoing step S2005 is even or odd (step S2006). When the quantization value q is even in the judgment at the step S2006, the information extraction portion 51 judges that the logical value of the digital information which has been embedded in the n-th block is "0" (step S2007). On the other hand, when the quantization value q is judged as being odd at the foregoing step S2006, the information extraction portion 51 judges that the logical value of the digital information which has been embedded in the n-th block is "1" (step S2008).

In order to perform the above-mentioned digital information extraction processing (the foregoing steps S2002 to S2008) with respect to all the first to N-th blocks, the information extraction portion 51 judges whether or not the processing has been performed with respect to all of the blocks (steps S2009). When the extraction processing of the digital information in the first to N-th blocks is judged as not being performed at the step S2009, the value of the counter n is incremented by "1" in order to proceed to extraction processing of the digital information in the subsequent (n+1)-th block (step S2010). Thereafter, the program is returned to the foregoing step S2002, to repeatedly perform the same processing. On the other hand, when the extraction processing of the digital information in the first to N-th blocks has been performed in the judgment at the foregoing step S2009, the extraction processing is terminated.

The information extraction portion 51 thus performs the above-mentioned digital information extraction processing with respect to all the first to N-th blocks, respectively extracts logical values embedded in the image signal, and reproduces the logical values as a bit stream 84 of the digital information.

As described in the foregoing, in the digital information extracting apparatus 3B according to the fifth embodiment of the present invention, the logical value of embedded digital information is judged by the results of extracting a plurality of frequency coefficients C in lower frequency components which are hardly affected by data destruction in a high frequency band and calculating a quantization value q from the absolute average value M of the frequency coefficients C using a predetermined method. Consequently, accurate digital information can be extracted without being affected by an unauthorized user's attempts.

(Sixth Embodiment)

Figure 21:
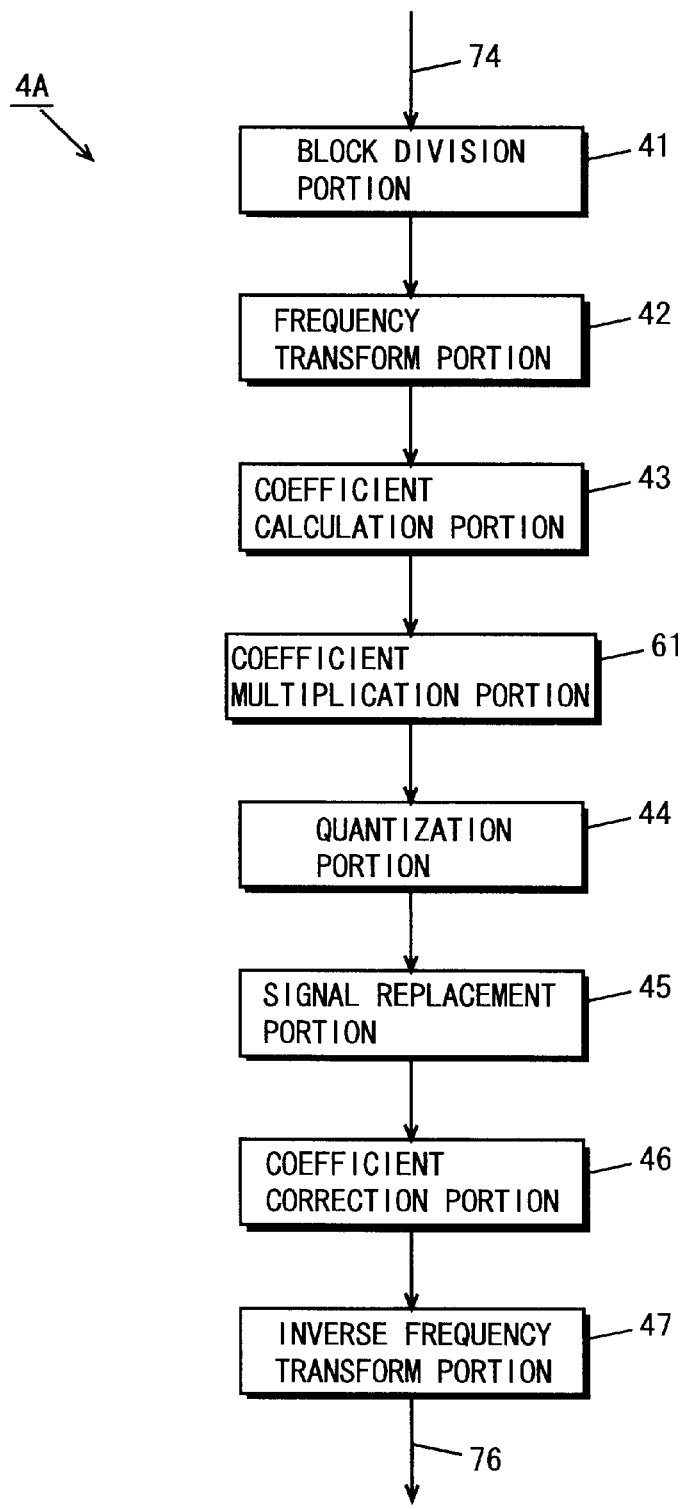
FIG. 21 is a block diagram showing the configuration of a digital information embedding apparatus 4A according to a sixth embodiment of the present invention.

FIG. 21 is a block diagram showing the configuration of a digital information embedding apparatus according to a sixth embodiment of the present invention. In FIG. 21, the digital information embedding apparatus 4A according to the sixth embodiment comprises a block division portion 41, a frequency transform portion 42, a coefficient calculation portion 43, a coefficient multiplication portion 61, a quantization portion 44, a signal replacement portion 45, a coefficient correction portion 46, and an inverse frequency transform portion 47.

The block division portion 41, the frequency transform portion 42, the coefficient calculation portion 43, the quantization portion 44, the signal replacement portion 45, the coefficient correction portion 46, and the inverse frequency transform portion 47 in the digital information embedding apparatus 4A according to the sixth embodiment respectively have the same configurations as the block division portion 41, the frequency transform portion 42, the coefficient calculation portion 43, the quantization portion 44, the signal replacement portion 45, the coefficient correction portion 46, and the inverse frequency transform portion 47 in the digital information embedding apparatus 3A according to the fourth embodiment, and are assigned the same reference numerals and hence, the description thereof is partially omitted.

The block division portion 41 receives a digitized image signal 74, and divides the image signal 74 into a plurality of blocks in a predetermined block size. The frequency transform portion 42 performs frequency transform for each of the blocks obtained by the division carried out in the block division portion 41, to calculate frequency coefficients C. The coefficient calculation portion 43 selects a plurality of particular frequency coefficients C out of the frequency coefficients C obtained by the frequency transform portion 42, to calculate the average value of the absolute values (absolute average value) M and the energies S of the selected frequency coefficients C. The coefficient multiplication portion 61 multiplies a frequency coefficient string Ca used for calculating the energies S by a predetermined value L (L is a real number of not more than one) if the energies S calculated by the coefficient calculation portion 43 are in a range of less than a predetermined threshold value K and not less than a predetermined lower limit value K1 (K1≦K). The quantization portion 44 subjects the found absolute average value M to linear quantization to calculate a quantization value q using a predetermined quantization step-size Q only when the energies S found by the coefficient calculation portion 43 are not less than a predetermined threshold value K. The signal replacement portion 45 replaces the quantization value q with a value (q−1) or a value (q+1) to output the value of outputs the value q as it is on the basis of the quantization value q and the value of digital information to be embedded. The coefficient correction portion 46 subjects the quantization value (q−1) or (q+1) or the quantization value q which is outputted by the signal replacement portion 45 to inverse linear quantization to find an average value M' using the quantization step-size Q, and calculates a difference DM (=M'−M) between the average value M' and the absolute average value M, to correct all of the selected frequency coefficients C. The inverse frequency transform portion 47 respectively subjects all the blocks obtained by the division in the block division portion 41 to inverse frequency transform, to reconstruct an image signal 76.

Figure 22:
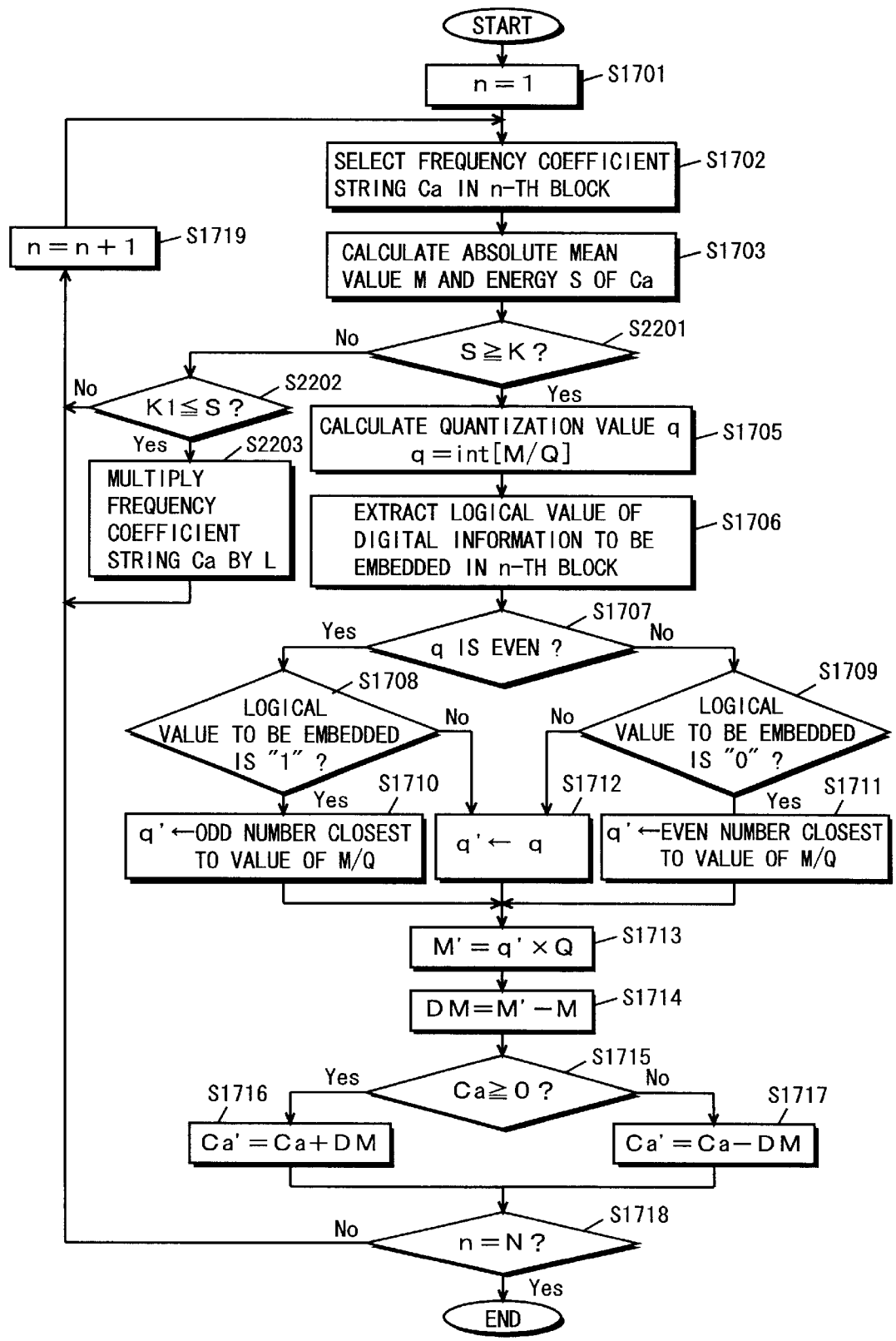
FIG. 22 is a flowchart showing processing performed by a coefficient calculation portion 43, a coefficient multiplication portion 61, a quantization portion 44, a signal replacement portion 45, and a coefficient correction portion 46 shown in FIG. 21.
Figure 23:
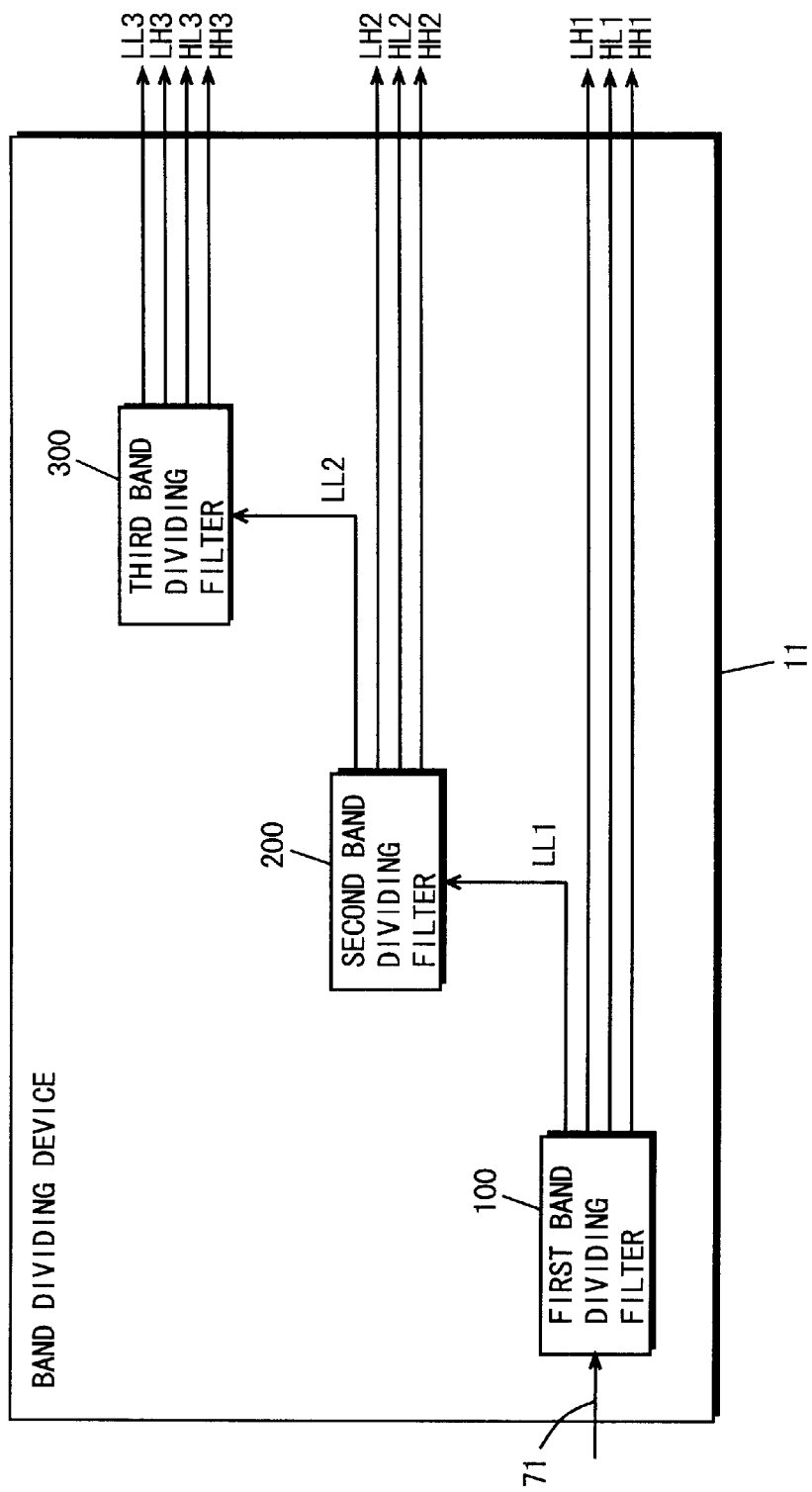
FIG. 23 is a block diagram showing an example of the configuration of a conventional band dividing device 11.
Figure 24:
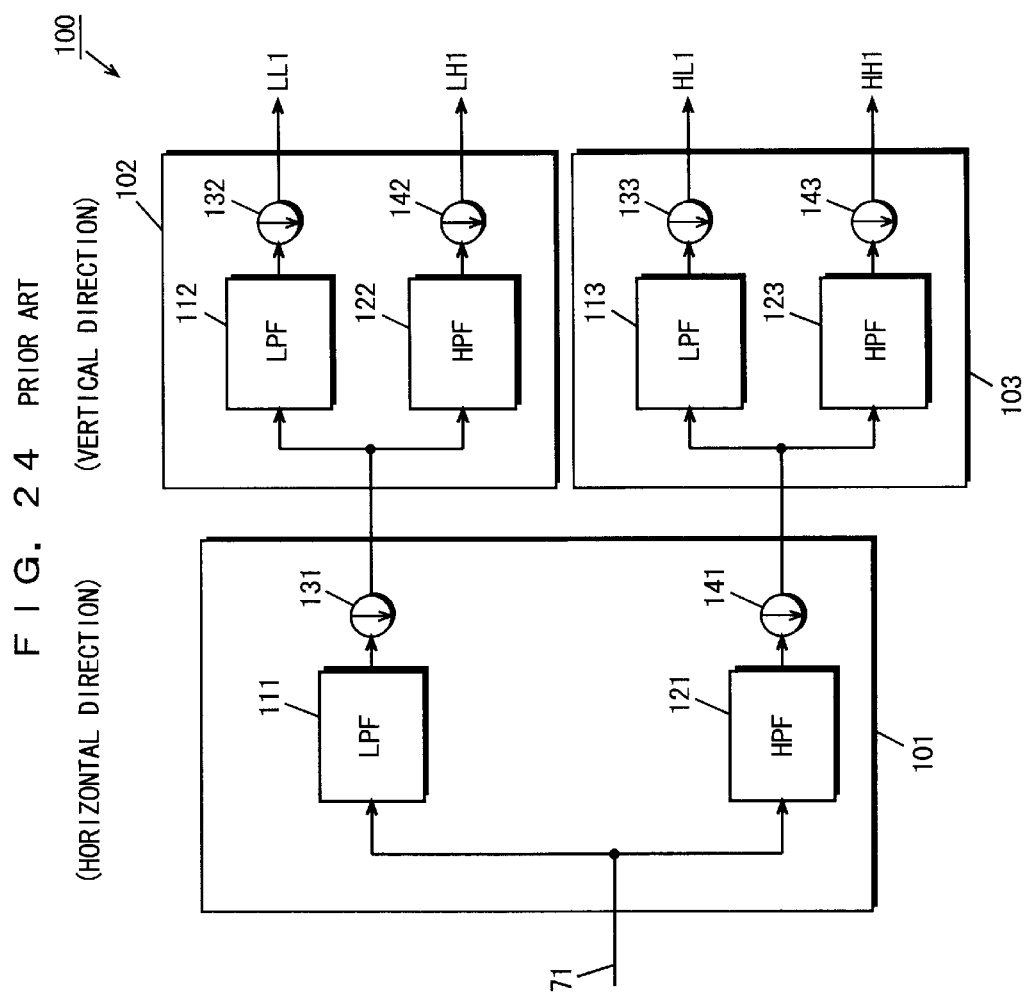
FIG. 24 is a block diagram showing an example of the detailed configuration of a band dividing filter shown in FIG. 23.
Figure 25:
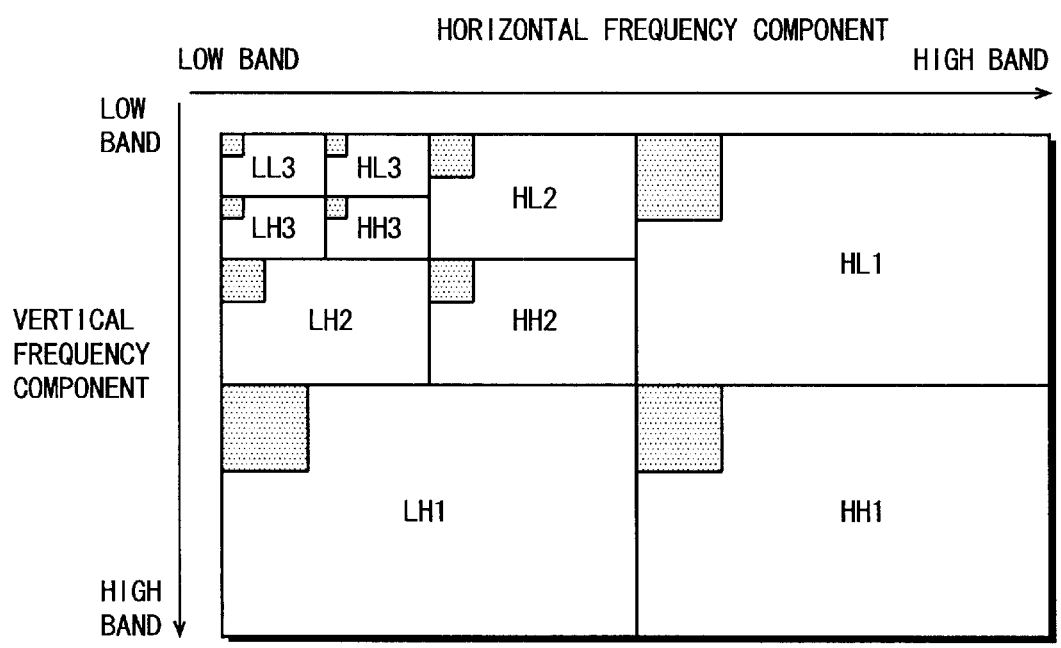
FIG. 25 is a diagram showing representation of signals which have been subjected to discrete wavelet transform by the band dividing device 11 shown in FIG. 23 by a two-dimensional frequency region.

Referring now to FIGS. 22 and 17, a digital information embedding method which is carried out by the digital information embedding apparatus 4A according to the sixth embodiment will be successively described. FIG. 22 is a flowchart showing processing performed by the coefficient calculation portion 43, the coefficient multiplication portion 61, the quantization portion 44, the signal replacement portion 45, and the coefficient correction portion 46 shown in FIG. 21. In FIG. 22, the steps at which the same processing as that shown in FIG. 17 is performed are assigned the same step numbers as those shown in FIG. 17 and hence, the description thereof is not repeated.

Referring to FIG. 22, the coefficient calculation portion 43 selects, with respect to the plurality of blocks obtained by the division in the block division portion 41, particular frequency coefficients $C_1$ to $C_a$, that is, a frequency coefficient string Ca out of frequency coefficients C in the n-th block found by the frequency transform portion 42 (step S1702). The coefficient calculation portion 43 calculates the absolute average value M and the energy S of the selected frequency coefficient string Ca (step S1703).

The coefficient multiplication portion 61 then judges whether or not the energy S calculated at the foregoing step S1703 is not less than a predetermined threshold value K (step S2201). When the energy S is judged as being not less than the threshold value K at the step S2201, the processing at the foregoing step S1705 and the subsequent steps are successively performed in order to embed the digital information in the n-th block. On the other hand, when the energy S is judged as being less than the threshold value K at the foregoing step S2201, the coefficient multiplication portion 61 further judges whether or not the energy S calculated at the foregoing step S1703 is not less than a predetermined lower limit value K1 (step S2202).

When the energy S is judged as being not less than the lower limit value K1 at the foregoing step S2202, the coefficient multiplication portion 61 multiplies each of the frequency coefficients $C_1$ to $C_a$ composing the frequency coefficient string Ca selected at the foregoing step S1702 by L (step S2203). When the energy S is judged as being less than the lower limit value K1 at the foregoing step S2202, and after the frequency coefficient string Ca is multiplied by L at the foregoing step S2203, the value of the counter n is incremented by "1" in order to proceed to embedding processing of the digital information in the subsequent (n+1)-th block (step S1719). Thereafter, the program is then returned to the foregoing step S1702, to repeatedly perform the same processing.

An example in which the frequency coefficient string C9 shown in FIG. 16(c) is multiplied by L is illustrated below. In this example, the energy S is calculated as the average of the absolute amplitude values of the frequency coefficient string C9. The threshold value K is taken as 20, and the lower limit values K1 and L are respectively taken as 15 and 0.9.

The energy S of the frequency coefficient string C9 selected at the foregoing step S1702 is 18.9 (=170/9) when the frequency coefficient string C9 is as follows:

$$C9=\{40, -40, 50, 20, -7, 5, -4, 3, 1\}$$

Consequently, the energy is less than the threshold value K and not less than the lower limit value K1. With respect to the frequency coefficient string C9 in this example, therefore, the frequency coefficients $C_1$ to $C_a$ are respectively multiplied by L, and are replaced with the following frequency coefficient string C9:

$$C9=\{36, -36, 45, 18, -6.3, 4.5, -3.6, 2.7, 0.9\}$$

(At this time, the energy S of the frequency coefficient string C9 after the replacement is 17 (=153/9)).

As described in the foregoing, according to the digital information embedding apparatus 4A according to the sixth embodiment of the present invention, the energy S of a frequency coefficient string Ca in low frequency components in the vicinity of a DC component is judged, to embed digital information. Consequently, the quality of an image is hardly degraded at the time of decoding, and the embedded digital information can be prevented from being lost against a third person's attempts for unauthorized utilization.

Furthermore, in the digital information embedding apparatus 4A according to the sixth embodiment of the present invention, only when the energy S of the selected frequency coefficient string Ca is close to a threshold value K (actually when it is slightly smaller), the frequency coefficient string Ca is multiplied by a predetermined value L. Consequently, in the digital information extraction processing, erroneous detection and incomplete detection in a case where it is judged whether or not the energy is not less than the threshold value K can be prevented more satisfactorily, as compared with the digital information embedding apparatus 3A according to the fourth embodiment, against a third person's attempts for unauthorized utilization. Accordingly, the embedded digital information can be more accurately extracted.

The digital image signal used in the digital information embedding apparatus and extracting apparatus according to the fourth to sixth embodiments is not limited to a still image signal. For example, it may be a moving image signal. In the case of the moving image signal, the same effect can be produced by performing the above-mentioned digital information embedding processing and extraction processing for each of frames composing a moving image. In the digital information embedding apparatus and extracting apparatus according to the fourth to sixth embodiments, the energy S is calculated using the coefficient calculation portion 43, and the digital information is embedded in only a block including wavelet coefficients whose energies are not less than the threshold value K. However, it goes without saying that the digital information may be embedded without performing the threshold processing.

Typically, each of functions realized by the digital information embedding apparatus and extracting apparatus according to the first to sixth embodiments is realized by a storage device (ROM, RAM, hard disk, etc.) storing predetermined program data and a CPU (Central Processing Unit) for executing the program data. In this case, each of the program data may be introduced through a recording medium such as a CD-ROM or a floppy disk.

While the invention has been described in detail, the foregoing description is in all aspects illustrative and not restrictive. It is understood that numerous other modifications and variations can be devised without departing from the scope of the invention.

What is claimed is:

1. A digital information embedding apparatus for embedding inherent digital information in a digital image signal, said apparatus comprising:
    band division means for dividing the digital image signal into a plurality of frequency bands to obtain wavelet coefficients using either discrete wavelet transformation or sub-band division;
    block division means for dividing the frequency band in which the digital information is to be embedded (hereinafter referred to as embedding object region) out of the frequency bands obtained by the division of the digital image signal into a plurality of blocks in a predetermined block size;
    key generation means for respectively generating secondary keys having different values from a key having a predetermined value using a predetermined function with respect to information composing the digital information;
    information embedding means for specifying the block in the embedding object region on the basis of each of the generated secondary keys, and respectively embedding the corresponding information composing the digital information in the wavelet coefficients in the specified block in the embedding object region; and
    band synthesis means for reconstructing a digital image signal in which the digital information has been embedded using the embedding object region after the embedding processing and the plurality of frequency bands other than the embedding object region.

2. A digital information embedding apparatus for embedding inherent digital information in a digital image signal, said apparatus comprising:
    band division means for dividing the digital image signal into a plurality of frequency bands to obtain wavelet coefficients using either discrete wavelet transformation or sub-band division;
    block division means for dividing the frequency band in which the digital information is to be embedded (hereinafter referred to as embedding object region) out of the frequency bands obtained by the division into a plurality of blocks in a predetermined block size;
    key generation means for respectively generating secondary keys having different values from a key having a predetermined value using a predetermined function with respect to information composing the digital information;
    energy analysis means for specifying the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region;
    information embedding means for controlling the key generation means such that another secondary key is generated when the energies are less than a predetermined set value, and respectively embedding the corresponding information composing the digital information in the wavelet coefficients in the specified block in the embedding object region when the energies are not less than the predetermined set value; and
    band synthesis means for reconstructing a digital image signal in which the digital information has been embedded using the embedding object region after the embedding processing and the plurality of frequency bands other than the embedding object region.

3. A method of embedding inherent digital information in a digital image signal, said method comprising:
    dividing the digital image signal into a plurality of frequency bands to obtain wavelet coefficients using either discrete wavelet transformation or sub-band division;
    dividing the frequency band in which the digital information is to be embedded (hereinafter referred to as embedding object region) out of the frequency bands obtained by said dividing of the digital image signal into a plurality of blocks in a predetermined block size;

respectively generating secondary keys having different values from a key having a predetermined value using a predetermined function with respect to information composing the digital information;

specifying the block in the embedding object region on the basis of each of the generated secondary keys, and respectively embedding the corresponding information composing the digital information in the wavelet coefficients in the specified block in said embedding object region; and reconstructing a digital image signal in which the digital information has been embedded using the embedding object region after the embedding processing and the plurality of frequency bands other than the embedding object region.

4. A method of embedding inherent digital information in a digital image signal, said method comprising:

dividing the digital image signal into a plurality of frequency bands to obtain wavelet coefficients using either discrete wavelet transformation or sub-band division;

dividing the frequency band in which the digital information is to be embedded (hereinafter referred to as embedding object region) out of the frequency bands obtained by said dividing of the digital image signal into a plurality of blocks in a predetermined block size;

respectively generating secondary keys having different values from a key having a predetermined value using a predetermined function with respect to information composing the digital information;

specifying the block in the embedding object region on the basis of each of the generated secondary keys, and respectively calculating the energies of the wavelet coefficients in each of the plurality of frequency bands, other than the embedding object region, corresponding to the same space representation region as the position of the specified block in the embedding object region;

controlling said generating step such that another secondary key is generated when the energies are less than a predetermined set value;

respectively embedding the corresponding information composing the digital information in the wavelet coefficients in the specified block in the embedding object region when the energy is not less than the predetermined set value; and reconstructing a digital image signal in which the digital information has been embedded using the embedding object region after the embedding processing and the plurality of frequency bands other than the embedding object region.

5. A recording medium having a computer executable program recorded thereon, the program being capable of instructing the computer to:

divide the digital image signal into a plurality of frequency bands to obtain wavelet coefficients using either discrete wavelet transformation or sub-band division;

divide the frequency band in which the digital information is to be embedded (hereinafter referred to as embedding object region) out of the frequency bands obtained by the division of the digital image signal into a plurality of blocks in a predetermined block size;

respectively generate secondary keys having different values from a key having a predetermined value using a predetermined function with respect to information composing digital information;

specify the block in the embedding object region on the basis of each of the generated secondary keys, and respectively embed the corresponding information composing the digital information in the wavelet coefficients in the specified block in said embedding object region; and reconstruct a digital image signal in which the digital information has been embedded using the embedding object region after the embedding processing and the plurality of frequency bands other than the said embedding object region.

6. A recording medium having a computer executable program recorded thereon, the program being capable of instructing the computer to:

divide the digital image signal into a plurality of frequency bands to obtain wavelet coefficients using either discrete wavelet transformation or sub-band division;

divide the frequency band in which the digital information is to be embedded (hereinafter referred to as embedding object region) out of the frequency bands obtained by the division of the digital image signal into a plurality of blocks in a predetermined block size;

respectively generate secondary keys having different values from a key having a predetermined value using a predetermined function with respect to information composing the digital information;

specify the block in the embedding object region on the basis of each of the generated secondary keys, and respectively calculate the energies of the wavelet coefficients in each of the plurality of frequency bands, other than the embedding object region, corresponding to the same space representation region as the position of the specified block in the embedding object region;

control the generation such that another secondary key is generated when the energies are less than a predetermined set value;

respectively embed the corresponding information composing the digital information in the wavelet coefficients in the specified block in the embedding object region when the energies are not less than the predetermined set value; and reconstruct a digital image signal in which the digital information has been embedded using the embedding object region after the embedding processing and the plurality of frequency bands other than the embedding object region.

* * * * *